(12) United States Patent
Iyoshi et al.

(10) Patent No.: US 10,150,511 B2
(45) Date of Patent: Dec. 11, 2018

(54) BODY STRUCTURE OF VEHICLE

(71) Applicant: MAZDA MOTOR CORPORATION, Hiroshima (JP)

(72) Inventors: Akira Iyoshi, Hiroshima (JP); Keizo Kawasaki, Hiroshima (JP); Takeshi Nakamura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 121 days.

(21) Appl. No.: 15/512,988

(22) PCT Filed: Aug. 15, 2016

(86) PCT No.: PCT/JP2016/073834
§ 371 (c)(1),
(2) Date: Mar. 21, 2017

(87) PCT Pub. No.: WO2017/033786
PCT Pub. Date: Mar. 2, 2017

(65) Prior Publication Data
US 2017/0297628 A1 Oct. 19, 2017

(30) Foreign Application Priority Data
Aug. 24, 2015 (JP) .................................. 2015-165121

(51) Int. Cl.
*B62D 25/02* (2006.01)
*B62D 25/04* (2006.01)
*B62D 25/20* (2006.01)

(52) U.S. Cl.
CPC ........... *B62D 25/025* (2013.01); *B62D 25/02* (2013.01); *B62D 25/04* (2013.01); *B62D 25/20* (2013.01)

(58) Field of Classification Search
CPC .............................. B62D 25/025; B62D 25/04
(Continued)

(56) References Cited

U.S. PATENT DOCUMENTS 8,439,428 B2 * 5/2013 Imamura ................ B60J 5/0426
296/187.12
9,809,258 B2 * 11/2017 Emura ................. B62D 25/025
(Continued)

FOREIGN PATENT DOCUMENTS

DE 19710894 A1 * 9/1998 ........... B62D 21/157
JP 2007-210367 A 8/2007
(Continued)

OTHER PUBLICATIONS

International Search Report issued in PCT/JP2016/073834; dated Oct. 4, 2016.

*Primary Examiner* — Jason S Daniels
(74) *Attorney, Agent, or Firm* — Studebaker & Brackett PC

(57) ABSTRACT

A body structure of a vehicle includes: a first panel and a second panel forming a closed cross-sectional portion; a partition panel; a first reinforcement body disposed between the first panel and the partition panel, and includes a first panel joint portion joined to the first panel, and a first flange portion joined to the partition panel; and a second reinforcement body which is disposed between the second panel and the partition panel, and includes a second panel joint portion joined to the second panel, and a second flange portion joined to the partition panel. A joint portion includes a rigid coupling portion in which the first panel and the first panel joint portion are coupled while being in contact with each other, and a flexible coupling portion in which the partition panel and the first flange portion are coupled to each other while interposing a damping member therebetween.

19 Claims, 18 Drawing Sheets

(58) Field of Classification Search
USPC .................................... 296/30, 187.12, 209
See application file for complete search history.

(56) References Cited

U.S. PATENT DOCUMENTS

| | | | |
|---|---|---|---|
| 2011/0206890 A1* | 8/2011 | Belpaire | B62D 29/002 |
| | | | 428/68 |
| 2013/0049391 A1 | 2/2013 | Kurogi et al. | |
| 2013/0049405 A1 | 2/2013 | Kurogi et al. | |
| 2013/0049408 A1 | 2/2013 | Kurogi et al. | |

FOREIGN PATENT DOCUMENTS

| | | |
|---|---|---|
| JP | 2013-049375 A | 3/2013 |
| JP | 2013-049376 A | 3/2013 |
| JP | 2013-049378 A | 3/2013 |

\* cited by examiner

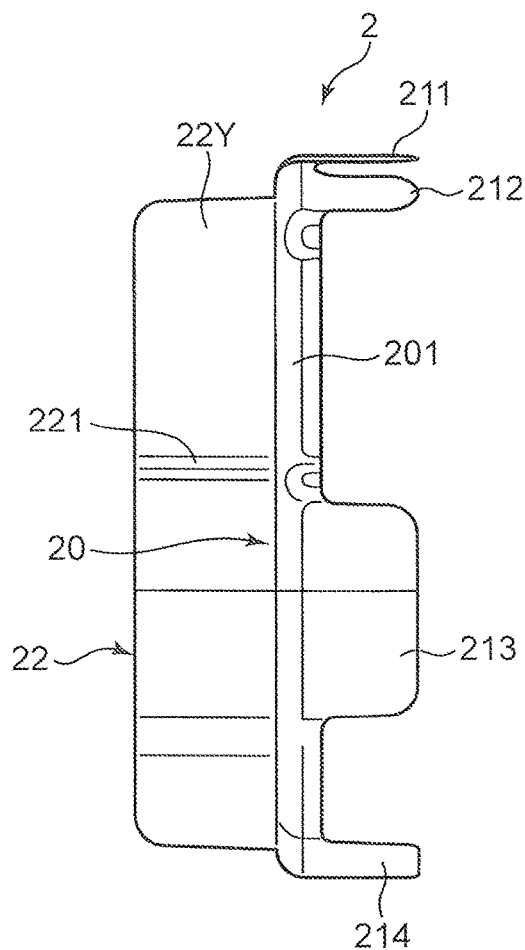
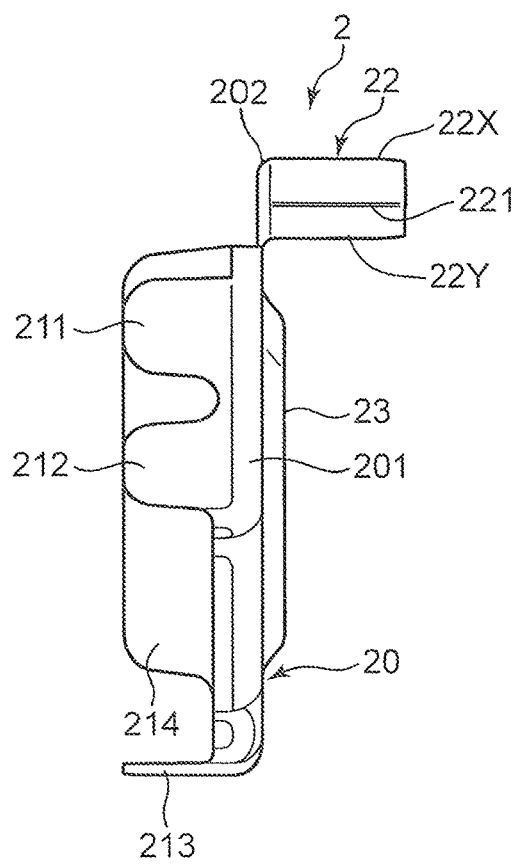
FIG.11A
FIG.11B

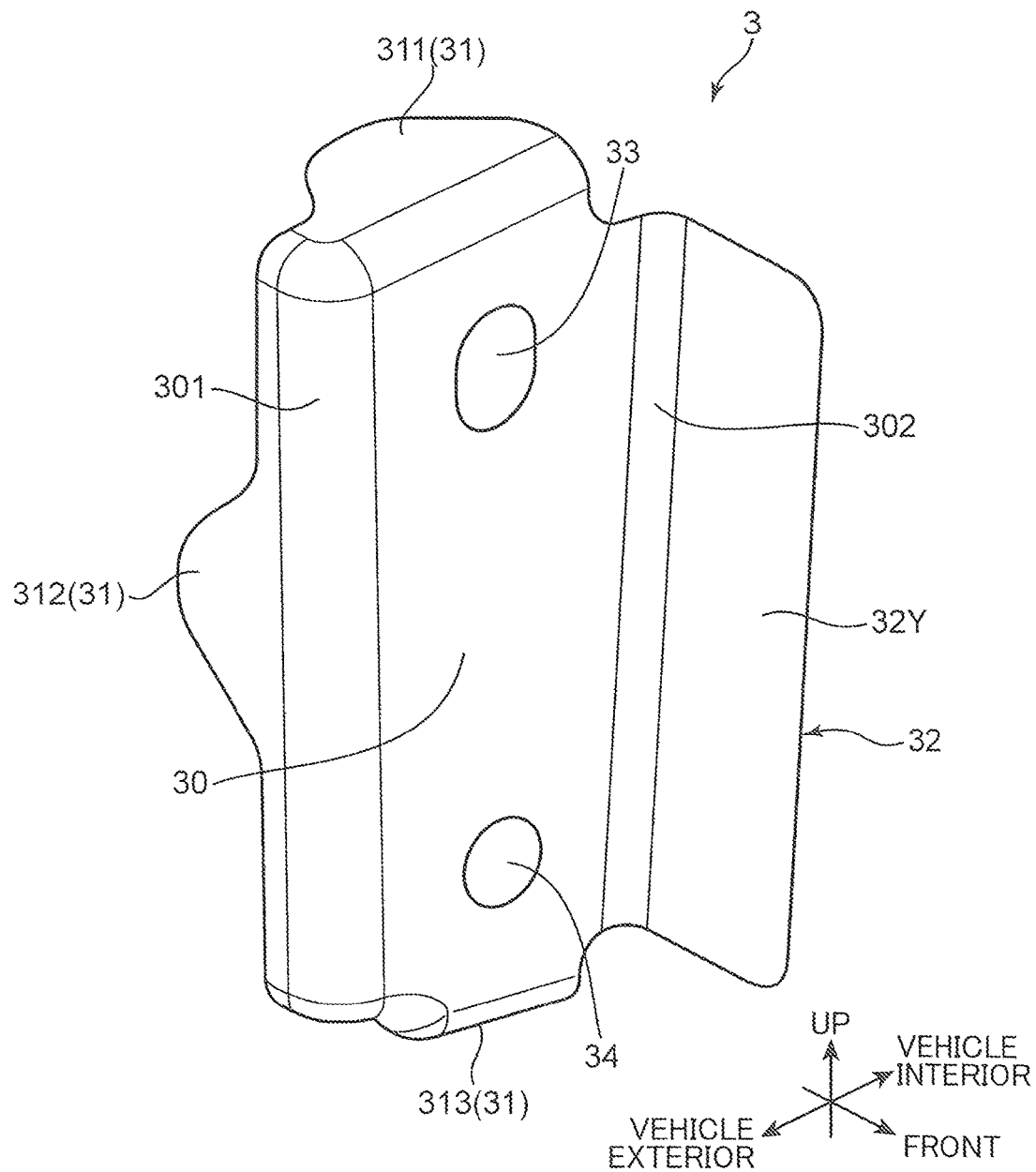

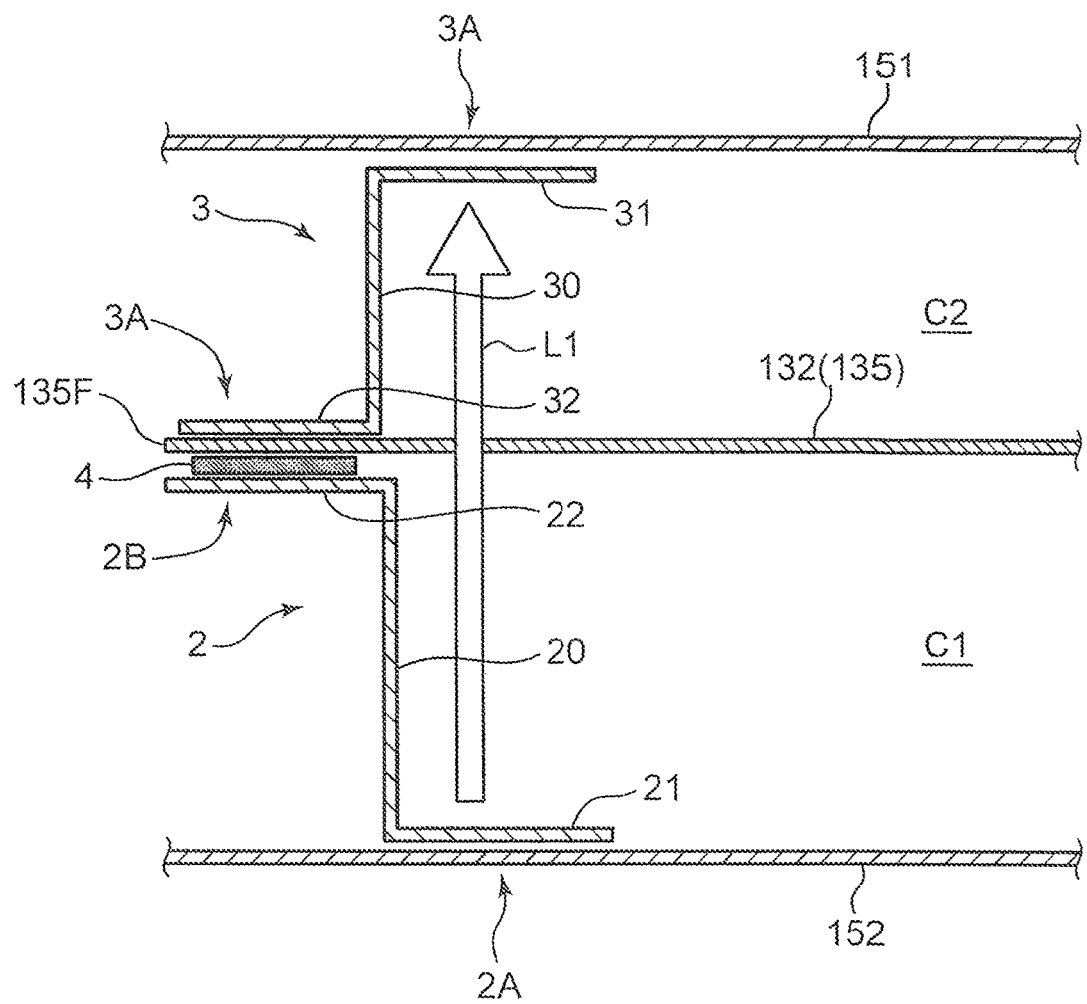

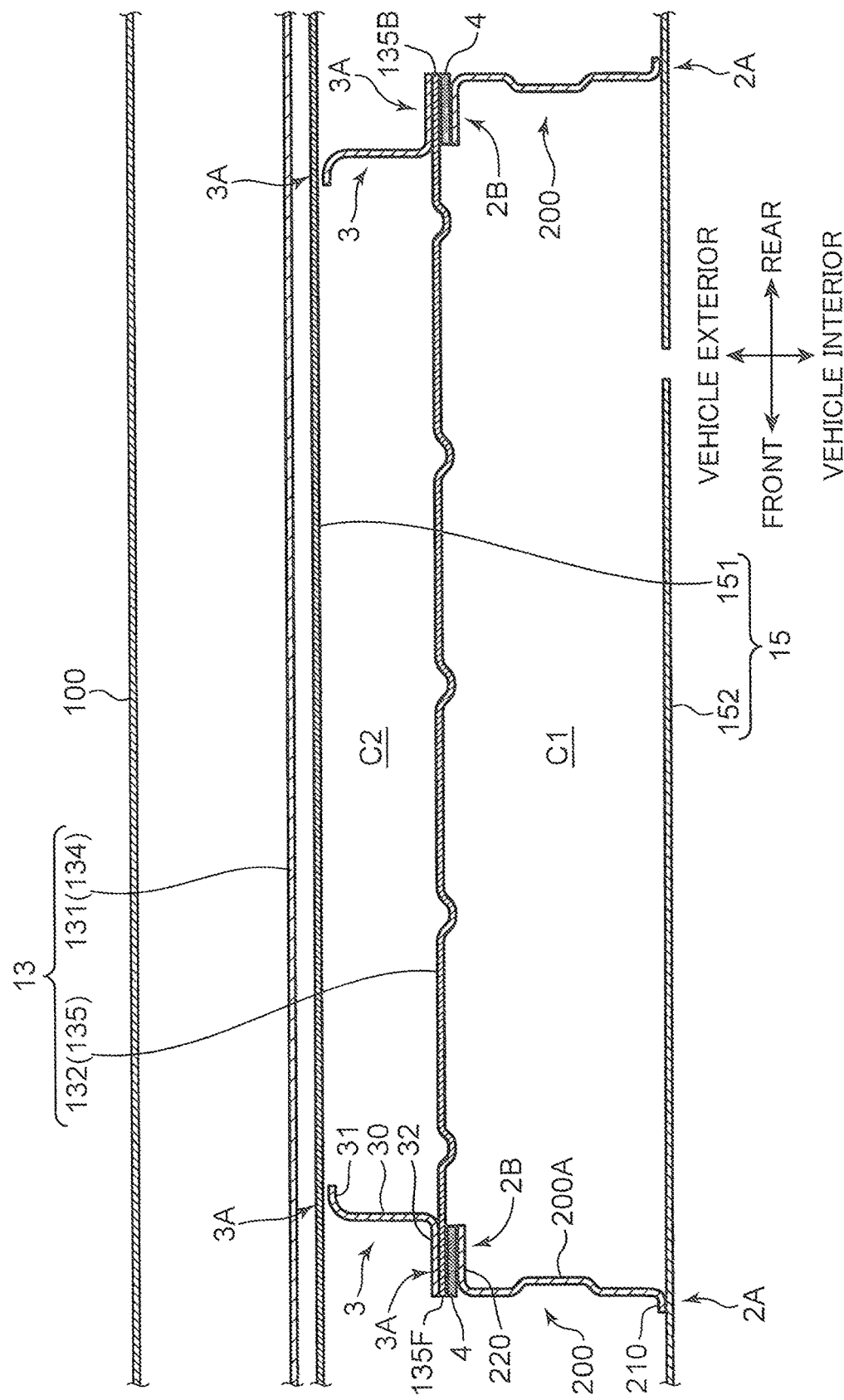

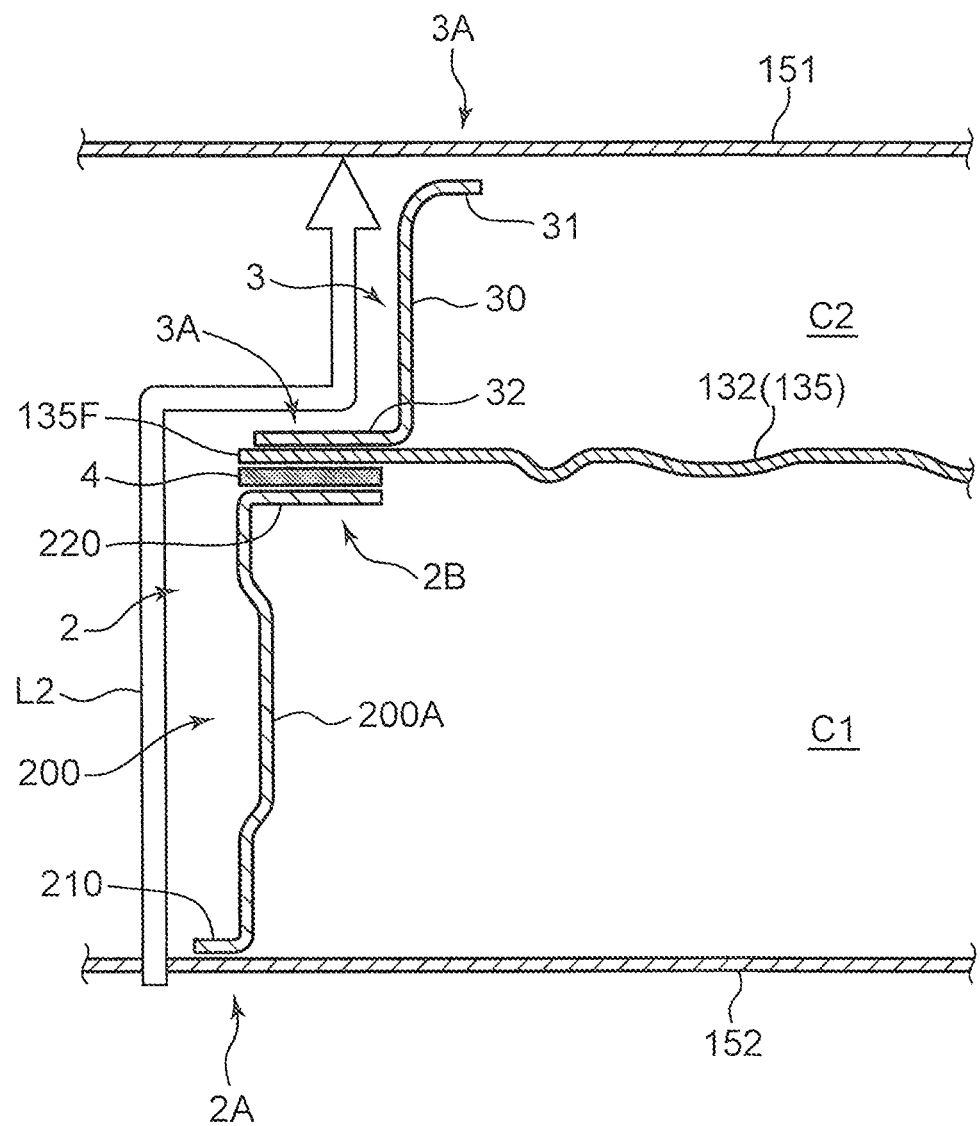

BODY STRUCTURE OF VEHICLE

TECHNICAL FIELD

The present invention relates to a body structure of a vehicle, and more particularly, to a vehicle-body structure of a portion which has a panel forming a closed cross-sectional portion and a partition panel disposed in the closed cross-sectional portion.

BACKGROUND ART

In vehicles such as automobiles, in order to improve the riding comfort felt by the occupant, there is a need for a vehicle structure which suppresses transmission of vibrations generated in various parts of the vehicle into the vehicle compartment as much as possible. In order to satisfy this requirement, the present applicant proposes, in Patent Literature 1 to 3, a technique for devising a joining mode of a bulkhead (reinforcement body) disposed in a frame that forms a closed cross-section, to the frame. The joining mode includes a rigid coupling portion in which the frame and the bulkhead are joined with each other while being in contact with each other, and a flexible coupling portion in which the frame and the bulkhead are joined with each other while interposing a damping member therebetween.

A vehicle includes a portion having a partitioned closed cross-section which is provided with two panels (frames) forming a closed cross-section extending in a predetermined direction, and a partition panel extending in the predetermined direction and disposed in the closed cross-section. Patent Literature 3 discloses a vehicle-body structure in which a bulkhead including the rigid coupling portion and the flexible coupling portion is incorporated in the portion having the partitioned closed cross-sectional portion.

The partitioned closed cross-sectional structure is adopted for, for example, a coupling portion between a center pillar and a side sill. In such a coupling portion, a request for suppressing deformation or vibration of the closed cross-sectional portion caused by the vibration of the vehicle is particularly high.

CITATION LIST

Patent Literature

Patent Literature 1: Japanese Unexamined Patent Publication No. 2013-49375
Patent Literature 2: Japanese Unexamined Patent Publication No. 2013-49376
Patent Literature 3: Japanese Unexamined Patent Publication No. 2013-49378

SUMMARY OF INVENTION

An object of the present invention is to provide a body structure of vehicle in which a damping member can effectively exhibit the vibration damping function, while preventing deformation of a closed cross-sectional portion, in a vehicle-body portion having a partitioned closed cross-sectional structure.

A body structure of a vehicle according to one aspect of the present invention includes: a first panel and a second panel which form a closed cross-sectional portion extending in a predetermined direction; a partition panel which extends in the predetermined direction and is disposed inside the closed cross-sectional portion; a first reinforcement body which is disposed between the first panel and the partition panel in the closed cross-sectional portion, and includes a first panel joint portion joined to the first panel, and a first flange portion joined to the partition panel; and a second reinforcement body which is disposed between the second panel and the partition panel in the closed cross-sectional portion, and includes a second panel joint portion joined to the second panel, and a second flange portion joined to the partition panel, wherein a joint portion formed by the first reinforcement body includes a rigid coupling portion in which the first panel and the first panel joint portion are coupled while being in contact with each other, and a flexible coupling portion in which the partition panel and the first flange portion are coupled to each other while interposing a damping member therebetween.

BRIEF DESCRIPTION OF DRAWINGS

FIG. 11A is a side view of the first bulkhead,
and FIG. 11B is a top view of the first bulkhead.
FIG. 12 is a perspective view of a second bulkhead disposed within the closed cross-sectional portion of the side sill.
FIG. 14 is a diagram illustrating an arrangement state of the first and second bulkheads.
FIG. 15 is a cross-sectional view in the vehicle width direction of a coupling portion between the side sill and the center pillar according to a modified embodiment.
FIG. 16 is a diagram for explaining an arrangement state of the first and second bulkheads in the modified embodiment.

DESCRIPTION OF EMBODIMENTS

Hereinafter, embodiments of the present invention will be described in detail with reference to the drawings.

[Overall Description of Vehicle Body]

Figure 1:
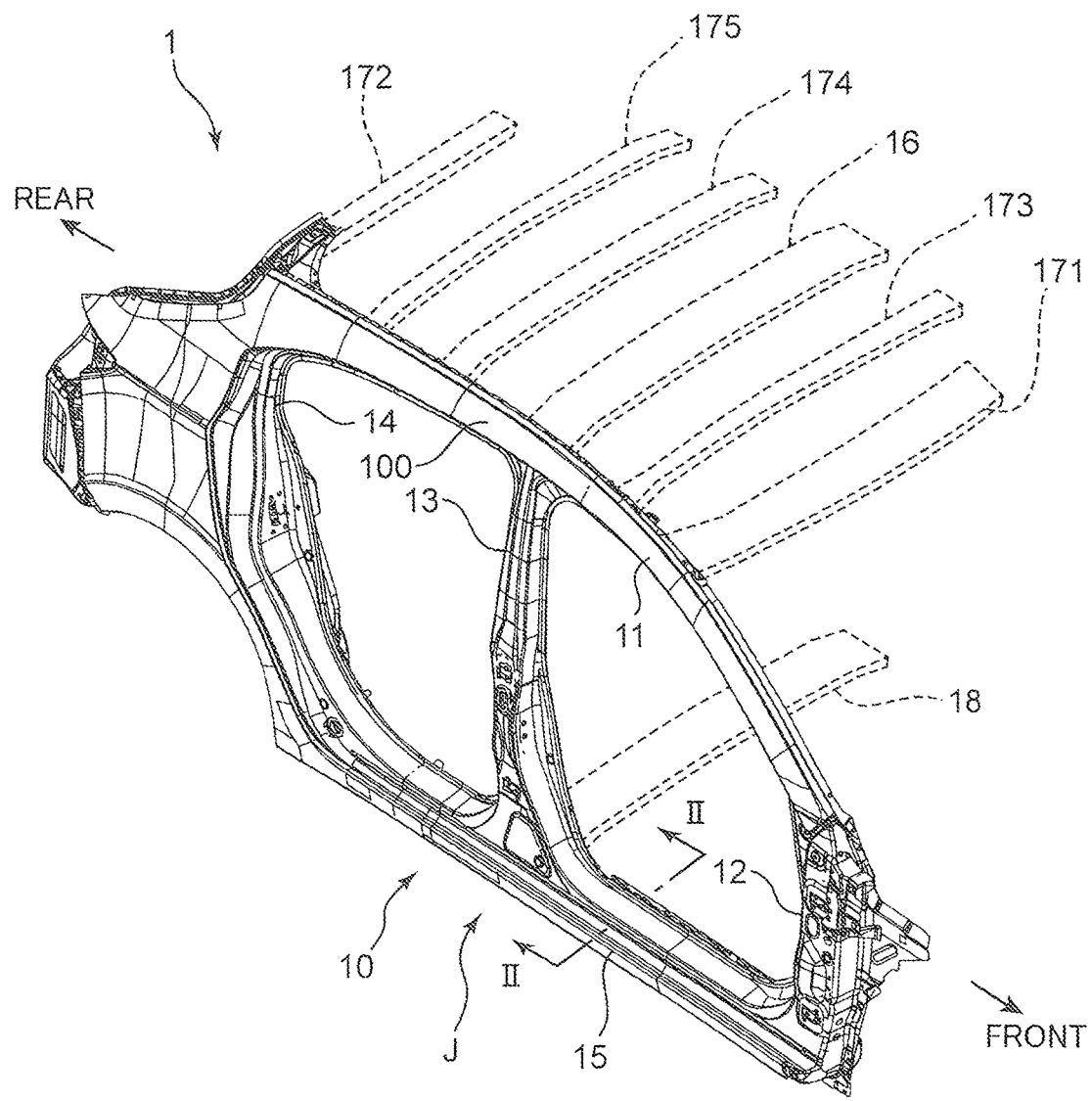
FIG. 1 is a perspective view illustrating a part of a body of a vehicle to which the present invention is applied.

FIG. 1 is a perspective view illustrating a part of a vehicle-body 1 of a vehicle to which the present invention is applied. In the drawings, an arrow of "front" indicating the front of the vehicle and an arrow of "rear" indicating the rear are appended. The arrows such as "front", "rear" and the like attached to the following drawings correspond to the front and rear of the vehicle illustrated in FIG. 1.

The vehicle-body 1 includes side frames 10 constituting the left and right side surfaces of the vehicle. In FIG. 1, only the side frame 10 on one side is illustrated. The side frame 10 includes a side frame outer 100 which is an exterior of a side surface portion of a vehicle, and a roof rail 11, a front pillar 12, a center pillar 13, a rear pillar 14, and a side sill 15 disposed on the vehicle interior side of the side frame outer 100.

The side frame outer 100 is a plate material formed by molding a single steel sheet into a predetermined shape through press molding and by punching the front and rear door openings. The outer surface of the side frame outer 100 is an exterior painted surface of the vehicle. The roof rail 11 extends in the upper part of the vehicle, and the side sill 15 extends in the lower part of the vehicle, in a front-rear direction of the vehicle, respectively. The roof rail 11 and the side sill 15 are connected by the front pillar 12 on the front side, are connected by the rear pillar 14 on the rear side, and are connected by the center pillar 13 in the vicinity of the center in the front-rear direction, in the up-down direction, respectively.

The side sill 15 extending in the front-rear direction (predetermined direction) and the center pillar 13 extending in the up-down direction form a connecting portion J intersecting with each other in a substantially T shape in a state in which the lower end portion of the center pillar 13 is connected to the intermediate portion of the side sill 15 in the front-rear direction. In the present embodiment, an example in which the body structure of vehicle according to the present invention is applied to the connecting portion J is illustrated.

Between the roof rail 11 of one side frame 10 and a roof rail (not illustrated) of the other side frame, a plurality of reinforcements (hereinafter, simply referred to as "reinforcer" in the present specification) extending in the vehicle width direction, and a header are installed. In the present embodiment, the roof reinforcer 16 is installed at the arrangement position of the center pillar 13, and three roof reinforcers 173, 174, and 175 are installed on front and rear sides of the roof reinforcer 16. Further, a front header 171 is installed on the front side of the vehicle, and a rear header 172 is installed on the rear side. A roof panel (not illustrated) is attached between a pair of side frames 10 so as to cover the roof rails 173 to 175 and the headers 171 and 172. Further, a plurality of cross members is installed between one side sill 15 and the other side sill (not illustrated). In FIG. 1, only a cross member 18 installed in the connecting portion J is illustrated.

[Structure of Connecting Portion J]

Figure 2:
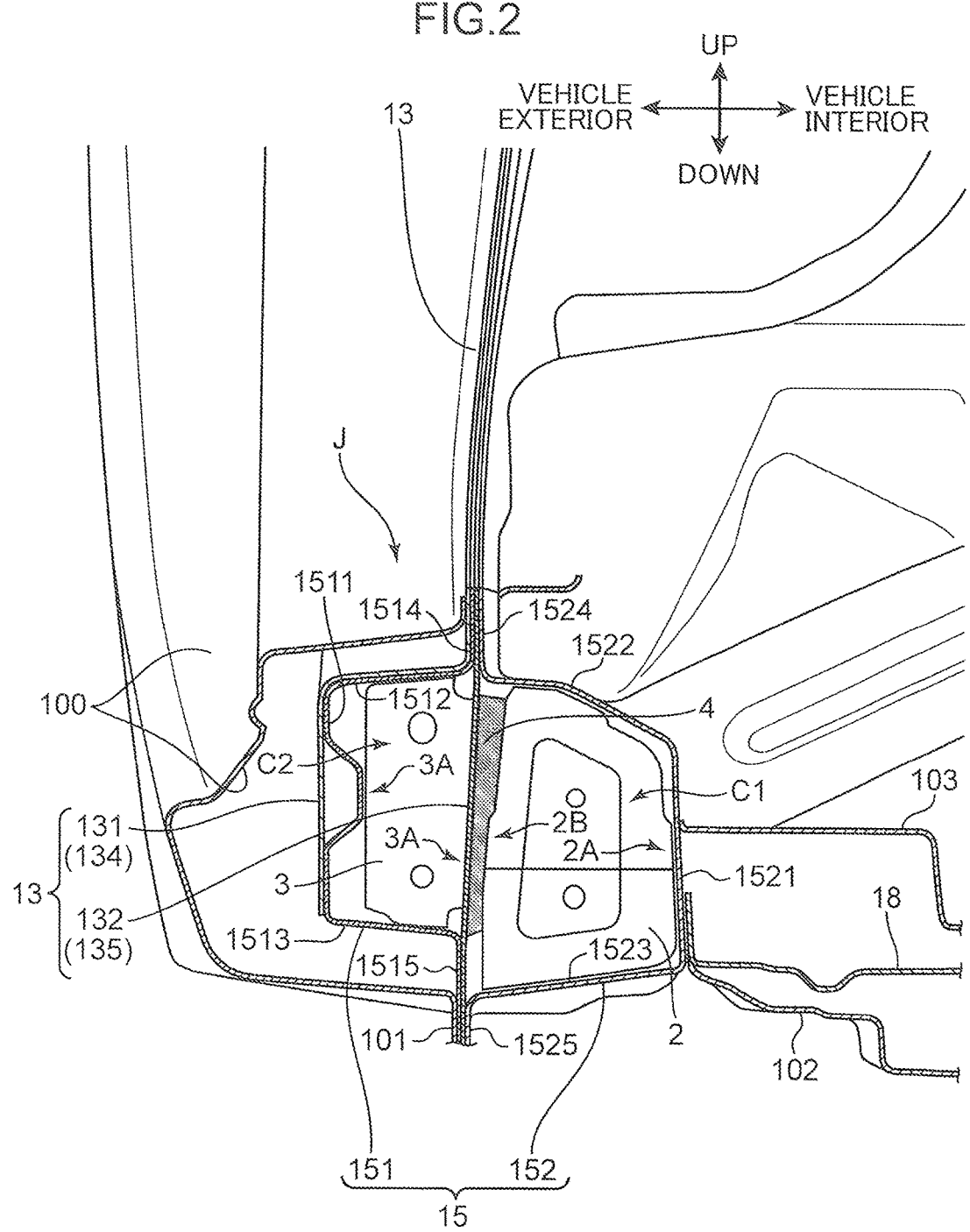
FIG. 2 is a schematic cross-sectional view taken along a line II-II of FIG. 1.
Figure 3:
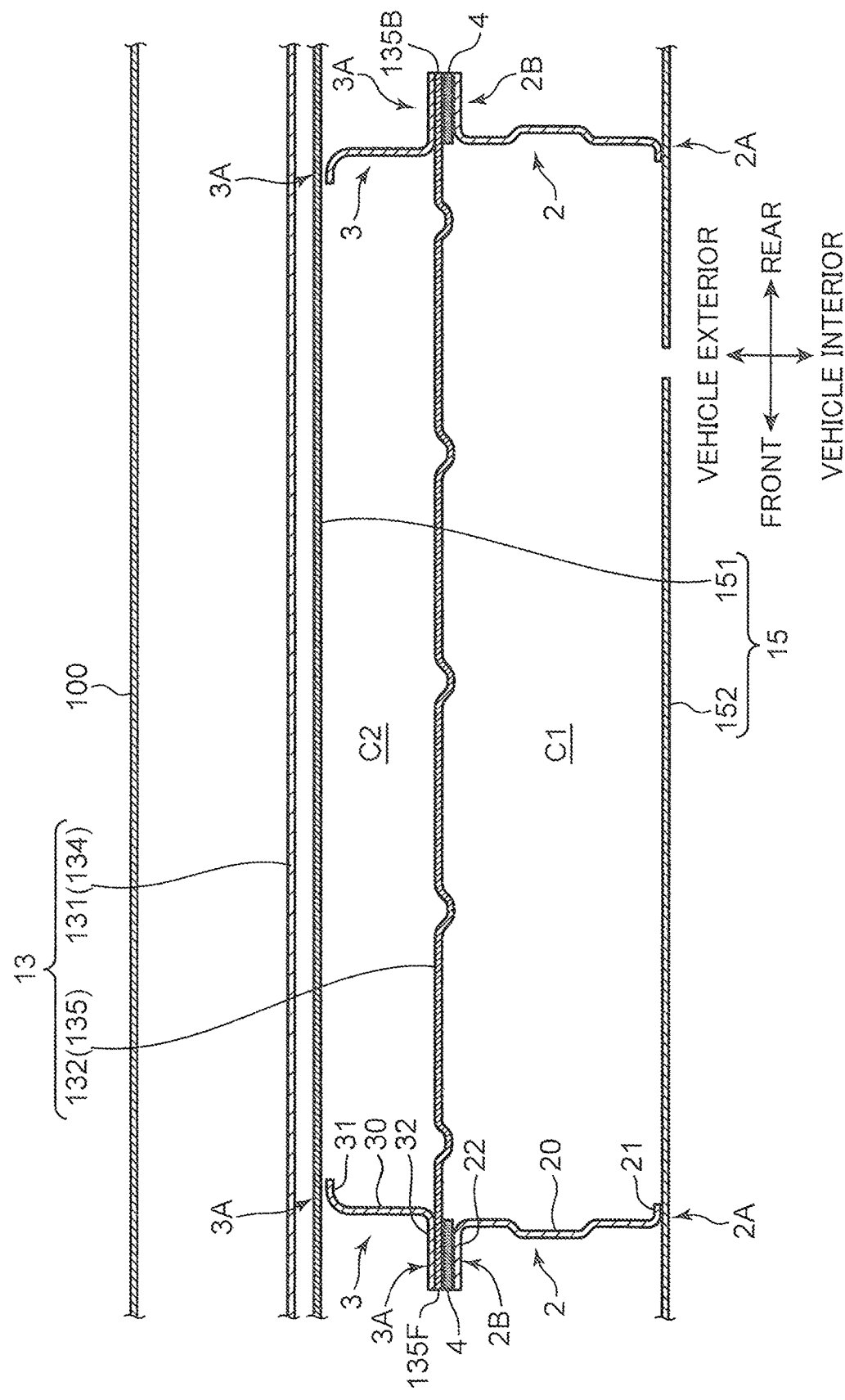
FIG. 3 is a cross-sectional view of a coupling portion between a side sill and a center pillar in a vehicle width direction.

FIG. 2 is a schematic cross-sectional view taken along a line II-II of FIG. 1, and FIG. 3 is a cross-sectional view in the vehicle width direction of the connecting portion J between the side sill 15 and the center pillar 13. The vehicle exterior of the connecting portion J is covered with a side frame outer 100. The vehicle interior side of the connecting portion J, that is, the bottom portion of the vehicle compartment is covered with a floor panel 102. On the floor panel 102, the cross member 18 and a seat bracket 103 as its constituent member are disposed. Further, a first bulkhead 2 (first reinforcement body) and a second bulkhead 3 (second reinforcement body) are disposed in the closed cross-sectional portion of the side sill 15 in the connecting portion J. Each member will be described below.

The side sill 15 is a vehicle-body rigid member having a closed cross-sectional portion extending in the front-rear direction (predetermined direction), and includes a side sill outer rein 151 (second panel) having a substantially U-shaped cross-section, and a side sill inner 152 (first panel) having a substantially U-shaped cross-section. The side sill outer reinforcer 151 includes a first side plate 1511 substantially parallel to the U-shaped opening portion, and a first upper plate 1512 and a first lower plate 1513 each extending from the upper edge and the lower edge of the first side plate 1511 in the vehicle interior direction. To perform joining with other members, a first upper flange portion 1514 is provided at the opening side end edge of the first upper plate 1512, and a first lower flange portion 1515 is provided at the opening side end edge of the first lower plate 1513, respectively.

The side sill inner 152 includes a second side plate 1521 substantially parallel to the U-shaped opening portion, and a second upper plate 1522 and a second lower plate 1523 each extending from the upper edge and the lower edge of the second side plate 1521 in the vehicle outer direction. To perform joining with other members, a second upper flange portion 1524 is provided at the opening side end edge of the second upper plate 1522, and a second lower flange portion 1525 is provided at the opening side end edge of the second lower plate 1523, respectively.

The center pillar 13 is a vehicle-body rigid member having a closed cross-section extending in the up-down direction, and includes a center pillar outer reinforcer 131 on the vehicle exterior side, and a center pillar inner 132 (partition panel) on the vehicle interior side. Both the center pillar outer reinforcer 131 and the center pillar inner 132 have butt joining flange portions at end portions in the front-rear direction, and the both are integrated by joining the flange portions through the spot welding.

Figure 4:
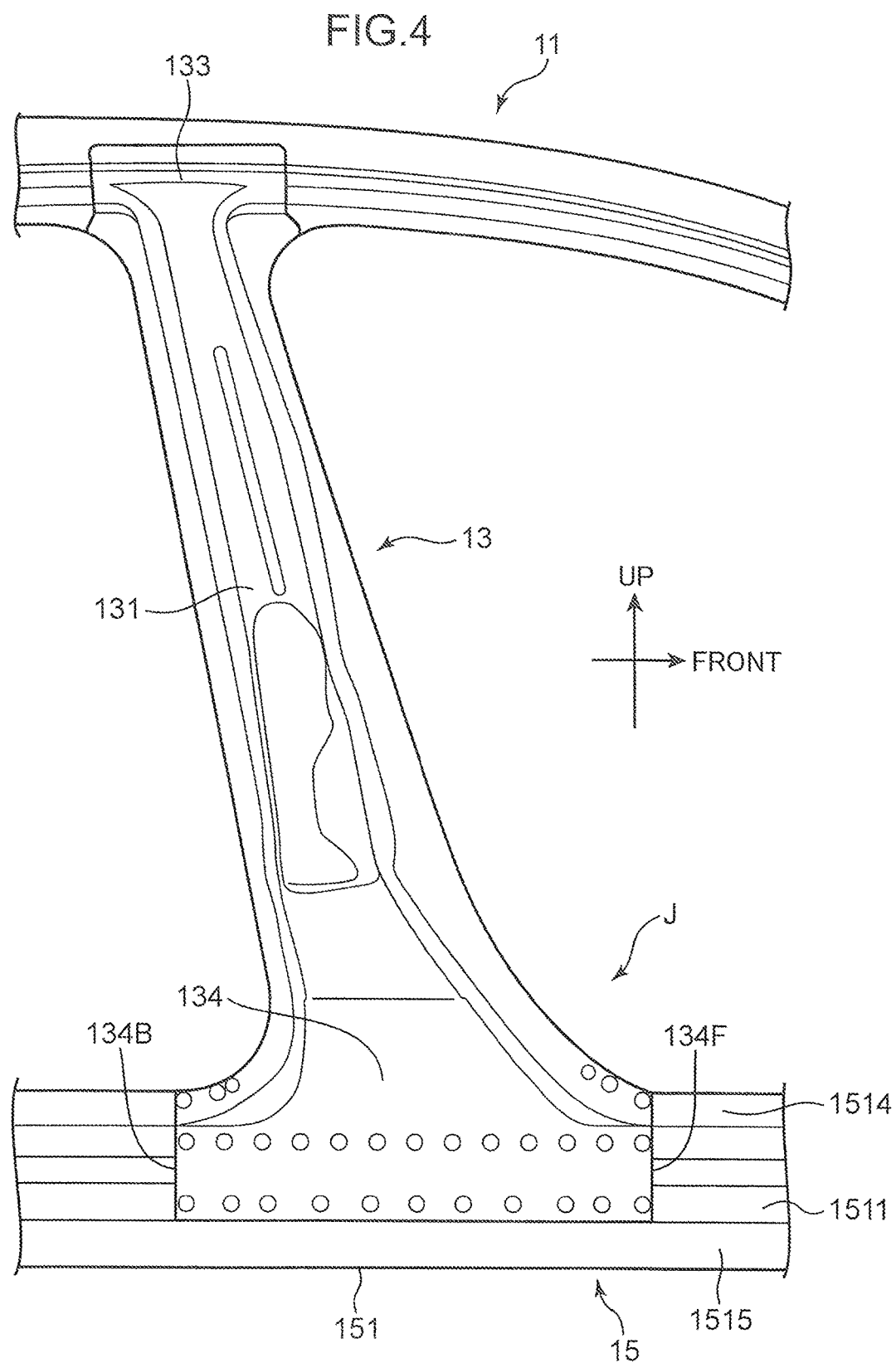
FIG. 4 is a side view of the coupling portion between the side sill and the center pillar of the vehicle-body viewed from a vehicle exterior of the vehicle, illustrating a state in which a side frame outer is detached.
Figure 6:
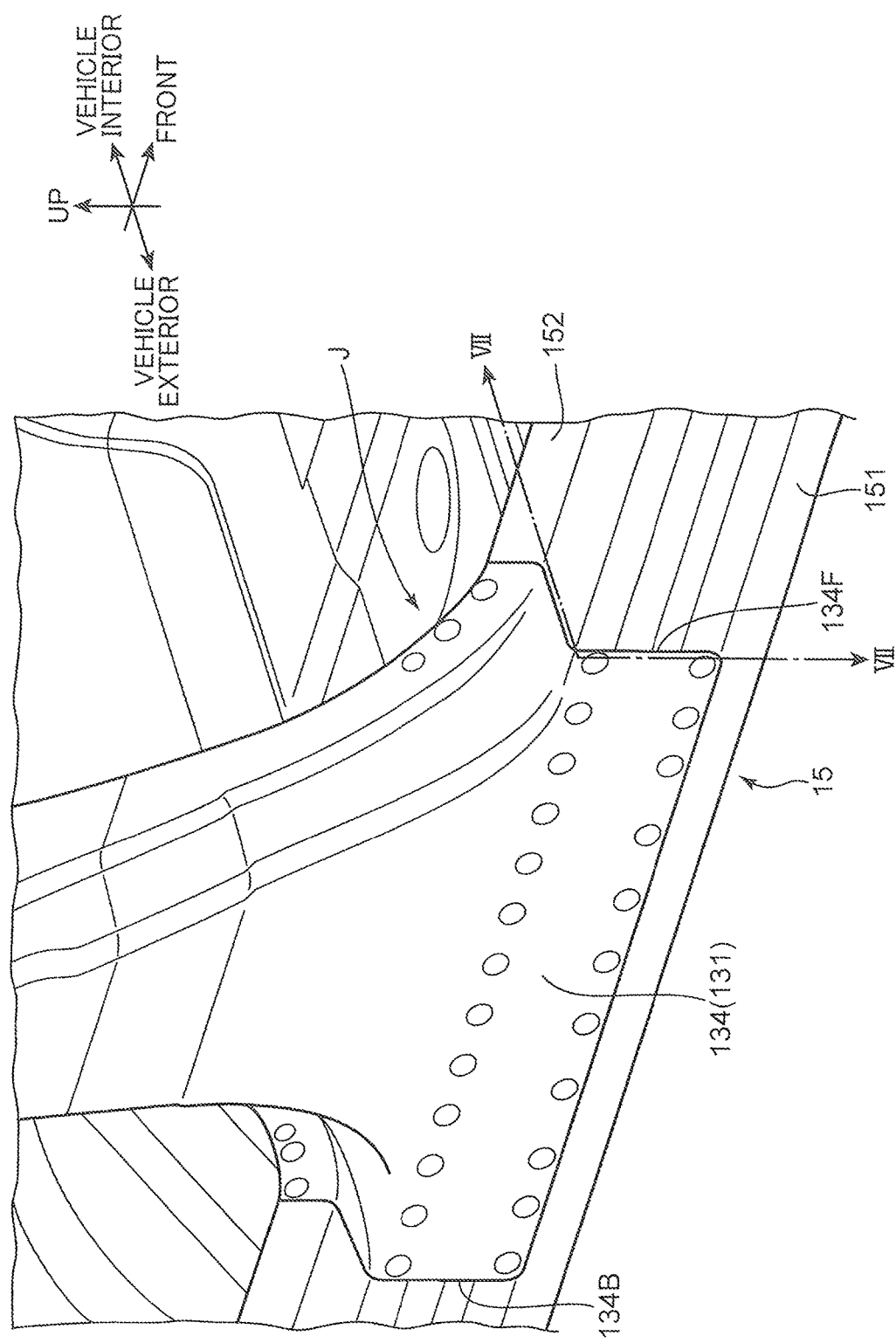
FIG. 6 is a perspective view of the coupling portion illustrated in FIG. 4.

FIG. 4 is a side view of the connecting portion J as seen from the vehicle exterior side of the vehicle, and illustrates a state in which the side frame outer 100 is detached. FIG. 6 is an enlarged perspective view of the connecting portion J in the same state as in FIG. 4. The center pillar outer rein 131 has an upper end portion 133 joined to the roof rail 11, and a lower end portion 134 joined to the side sill 15 (side sill outer reinforcer 151). The lower end portion 134 is a portion having a width in the front-rear direction wider than the main body portion of the center pillar outer reinforcer 131, and has a front end edge 134F and a rear end edge 134B at the front end and the rear end of the wide portion. Further, the lower end portion 134 is bent in an L shape in a cross-section in the vehicle width direction as illustrated in FIG. 2 to have a bulge in the vehicle outer direction. The lower end portion 134 has an inner surface in contact with an outer surface of the side sill outer reinforcer 151 and is fixed to the first side plate 1511 by spot welding.

Figure 5:
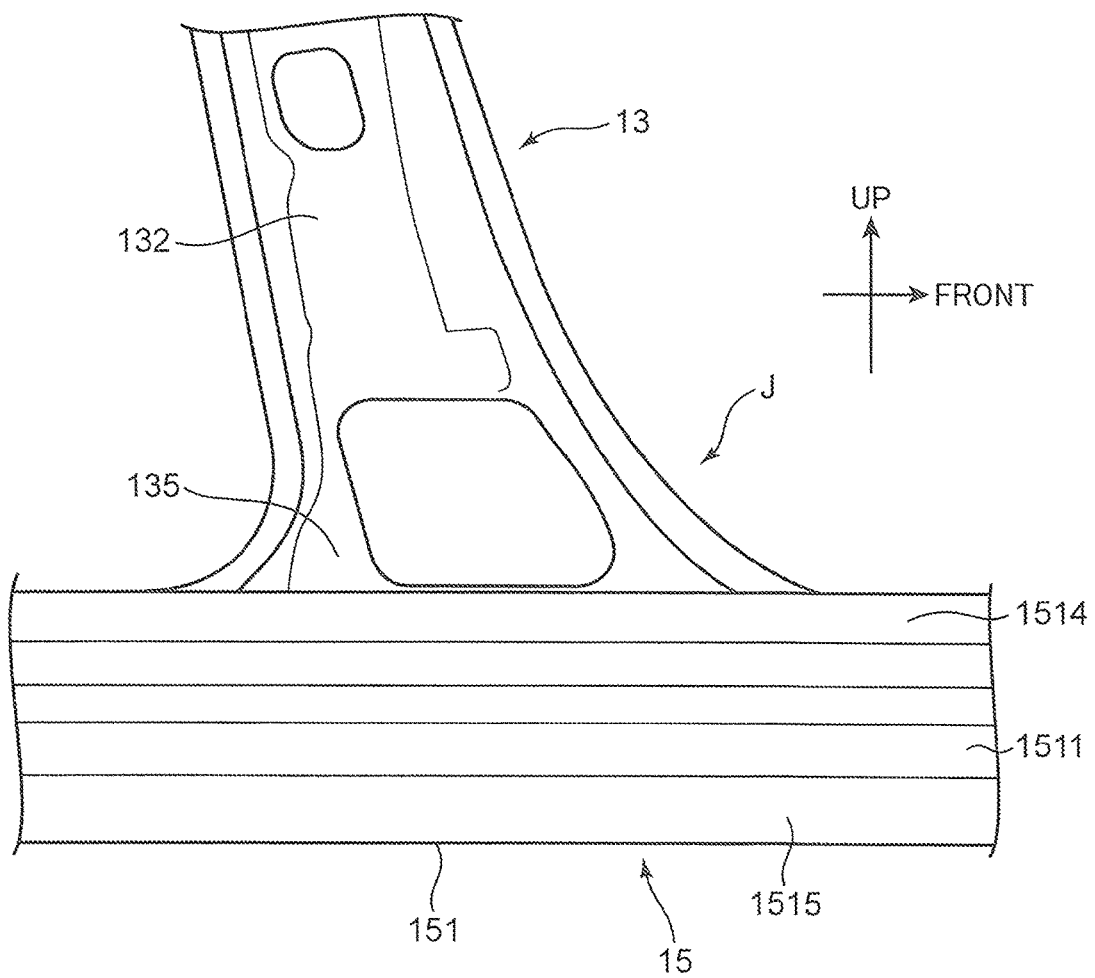
FIG. 5 is a side view illustrating a state in which a center pillar outer rein is detached from the state of FIG. 4.

FIG. 5 is a side view illustrating a state in which the center pillar outer reinforcer 131 is detached from the state of FIG. 4. The center pillar inner 132 is a substantially flat plate-like member extending in the up-down direction, and has a partition plate portion 135 (partition panel) disposed on the closed cross-sectional portion of the side sill 15 at the lower end thereof. As illustrated in FIG. 2, the closed cross-sectional portion of the side sill 15 is partitioned by the partition plate portion 135 into a first closed cross-sectional portion C1 and a second closed cross-sectional portion C2.

The first closed cross-sectional portion C1 is a space defined by the partition plate portion 135 and the side sill inner 152, and the second closed cross-sectional portion C2 is a space partitioned by the partition plate portion 135 and the side sill outer reinforcer 151.

The side sill outer reinforcer 151 and the side sill inner 152 are joined to each other with the partition plate portion 135 interposed in an abutting surface portion thereof. Specifically, the first upper flange portion 1514 and the second upper flange portion 1524 abut against each other with the upper end portion of the partition plate portion 135 interposed therebetween, and are fixed by spot welding. Further, the first lower flange portion 1515 and the second lower flange portion 1525 abut against each other with the lower end portion of the partition plate portion 135 interposed therebetween and are fixed with the lower end portion 101 of the side frame outer 100 by spot welding.

Figure 8:
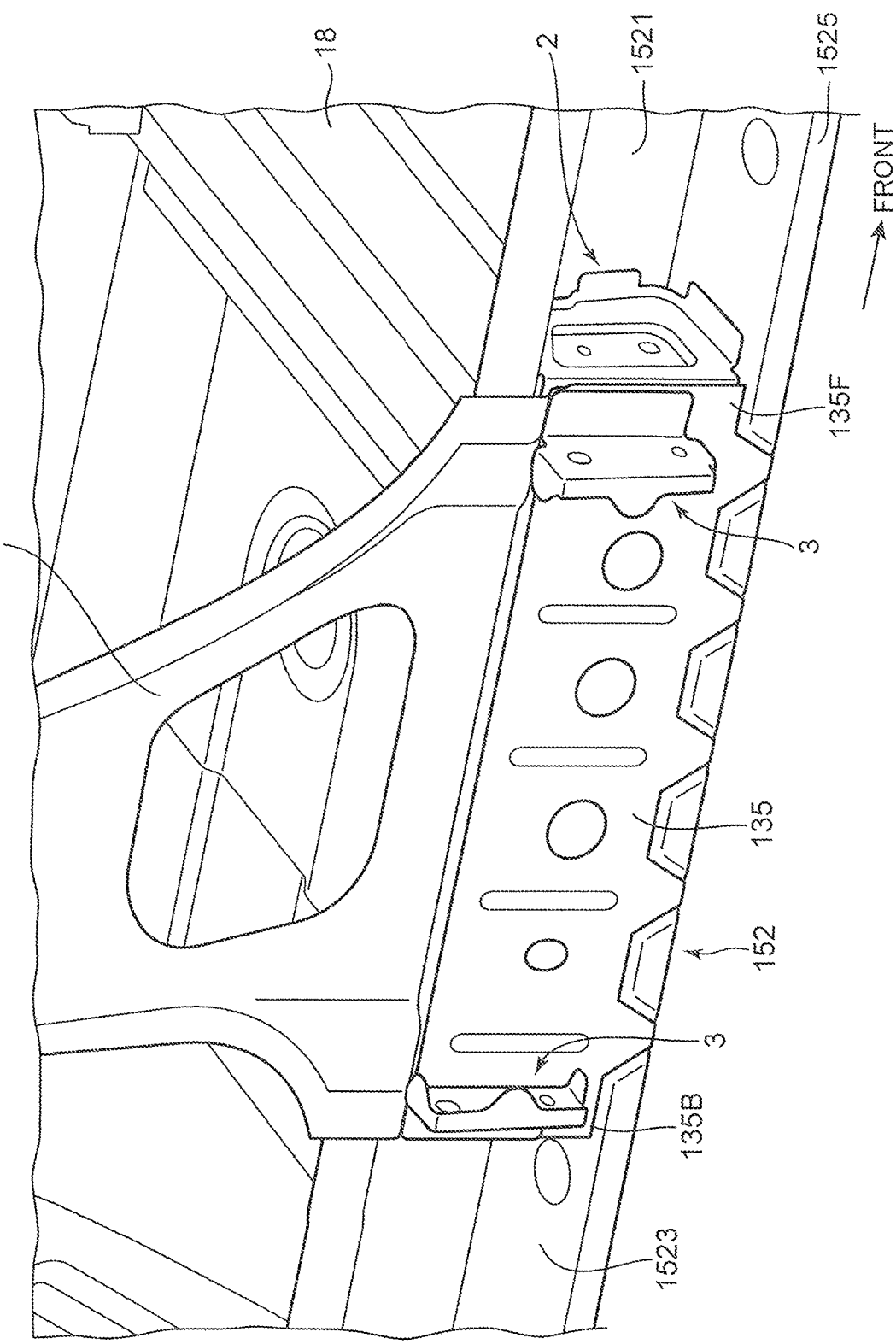
FIG. 8 is a perspective view illustrating a state in which the side sill outer rein is detached from the state of FIG. 5.

As illustrated in FIG. 8, the partition plate portion 135 is a portion in which the width in the front-rear direction (predetermined direction) is larger than that of the main body portion of the center pillar inner 132, and includes a front end edge 135F and a rear end edge 135B at the front end and the rear end of the wide portion. In the range from the front end edge 135F to the rear end edge 135B, the closed cross-sectional portion of the side sill 15 is divided into two closed cross-sectional portions C1 and C2 extending in the front-rear direction.

Figure 7:
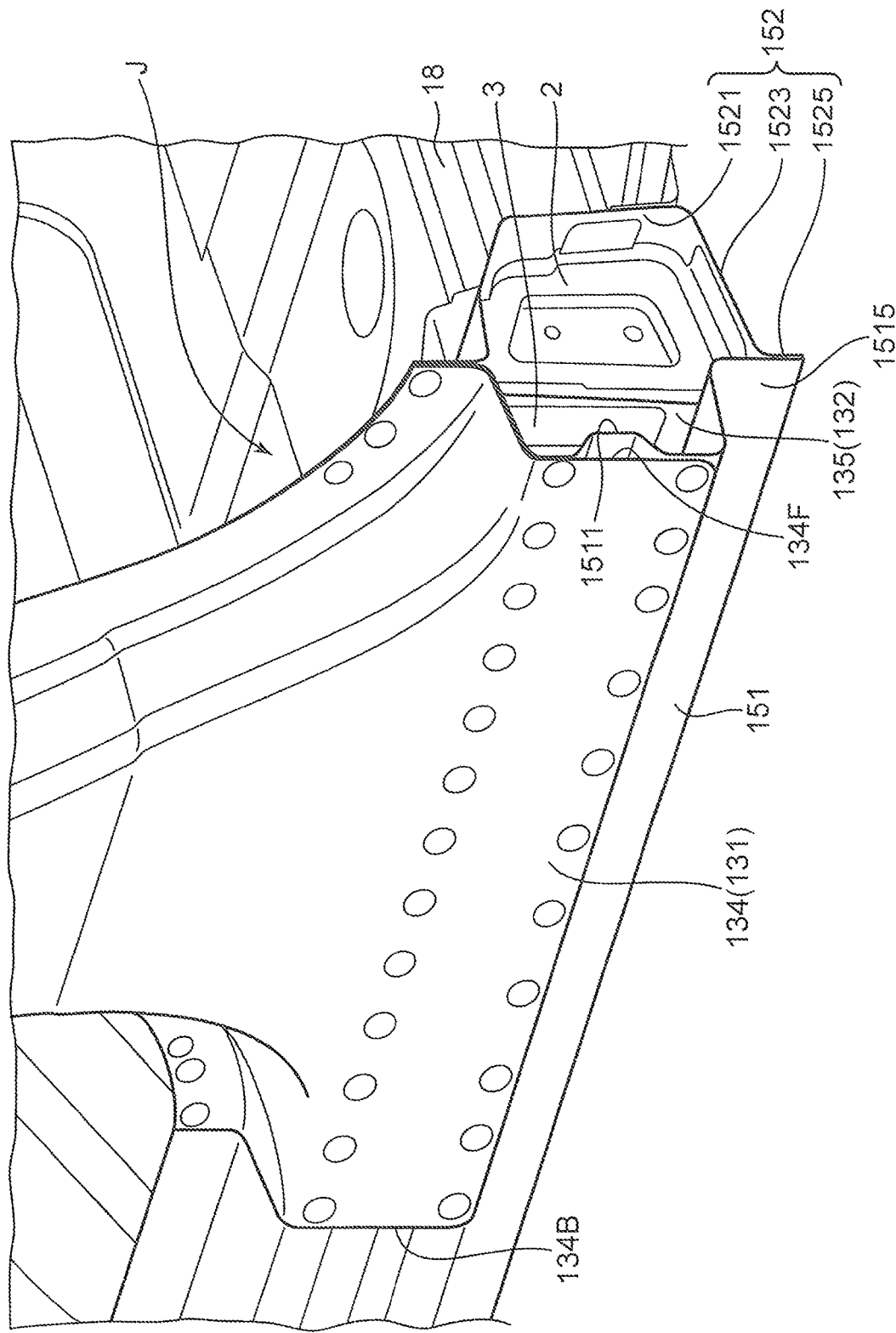
FIG. 7 is a cross-sectional view taken along a line VII-VII of FIG. 6.
Figure 9:
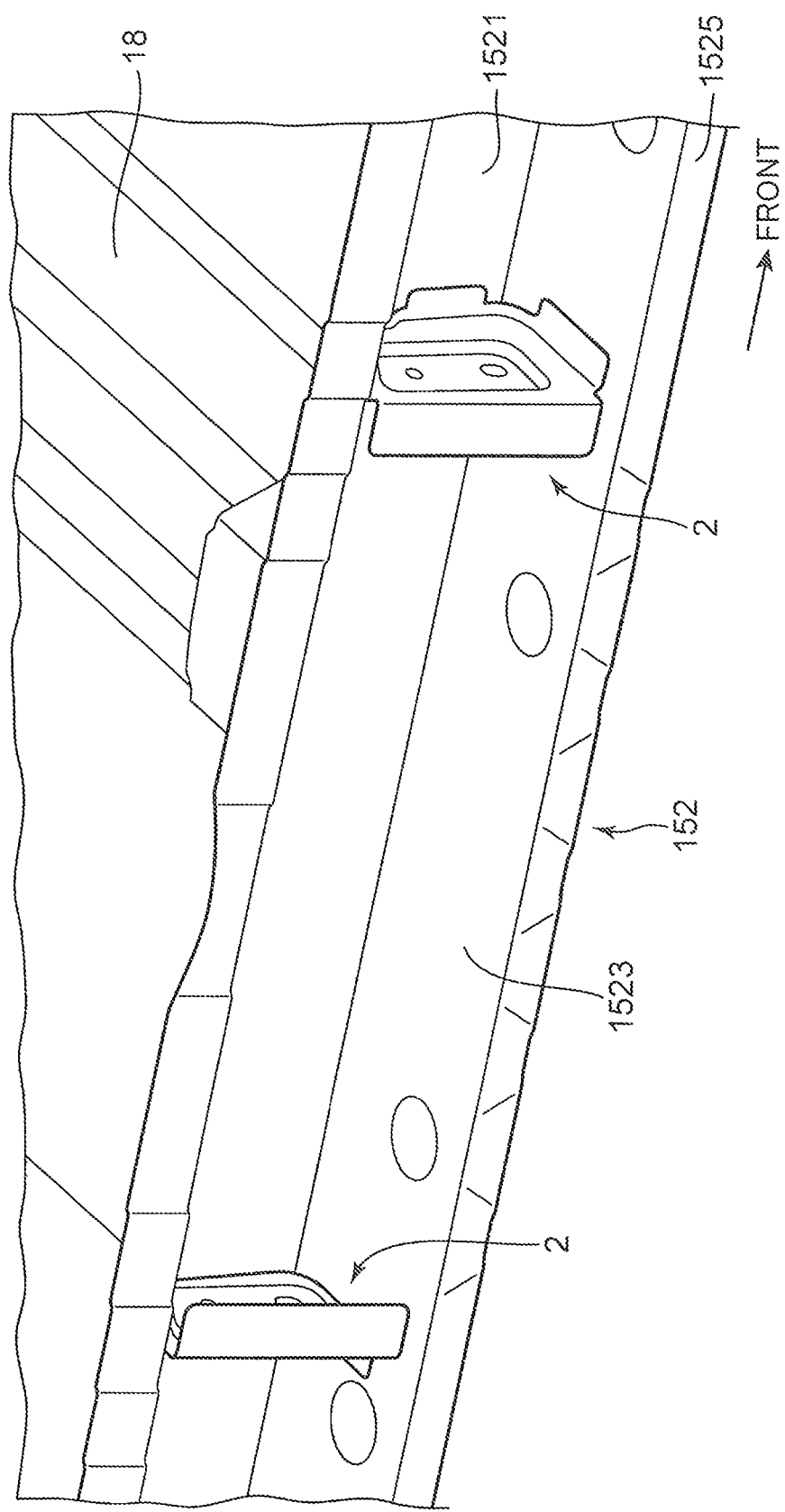
FIG. 9 is a perspective view illustrating a state in which the center pillar inner is detached from the state of FIG. 8.

The first bulkhead 2 and the second bulkhead 3 are reinforcement bodies which reinforce the rigidity of the side sill 15 in the vicinity of the connecting portion J. FIG. 7 is a cross-sectional view taken along a line VII-VII of FIG. 6, FIG. 8 is a perspective view illustrating a state in which the side sill outer reinforcer 151 is detached from the state of FIG. 5, and FIG. 9 is a perspective view illustrating a state in which the center pillar inner 132 is detached from the state of FIG. 8. A total of two first bulkheads 2 are disposed at the front and the rear in the first closed cross-sectional portion C1, and a total of two second bulkhead 3 are disposed at the front and the rear in the second closed cross-sectional portion C2, respectively.

The first and second bulkheads 2 and 3 on the front side are disposed near the front end edge 135F of the partition plate portion 135, respectively, and the first and second bulkheads 2 and 3 on the rear side are disposed near the rear end edge 135B, respectively. That is, the first bulkhead 2 is disposed between the side sill inner 152 and the partition plate portion 135 near the front end edge 135F and the rear end edge 135B, and has a joint portion for the side sill inner 152 and the partition plate portion 135. The second bulkhead 3 is disposed between the side sill outer reinforcer 151 and the partition plate portion 135 near the front end edge 135F and the rear end edge 135B, and has a joint portion for the side sill outer reinforcer 151 and the partition plate portion 135.

The first bulkhead 2 includes a first joint portion 21 (first panel joint portion) joined to the side sill inner 152 (first panel), and a first flange portion 22 joined to the partition plate portion 135 (partition panel). The second bulkhead 3 includes a second joint portion 31 (second panel joint portion) joined to the side sill outer reinforcer 151 (second panel), and a second flange portion 32 joined to the partition plate portion 135.

The joint portion formed by the first bulkhead 2 includes a rigid coupling portion 2A in which the side sill inner 152 and the first joint portion 21 are coupled to each other in an abutting state, and a flexible coupling portion 2B in which the partition plate portion 135 and the first flange portion 22 are coupled to each other in a state in which the damping member 4 is interposed therebetween. Meanwhile, each of the joint portions formed by the second bulkhead 3 is a rigid coupling portion, and includes a rigid coupling portion 3A in which the side sill outer reinforcer 151 and the second joint portion 31 are coupled to each other in an abutting state, and a rigid coupling portion 3A in which the partition plate portion 135 and the second flange portion 32 are coupled to each other in an abutting state.

[Detailed Description of First Bulkhead]

Figure 10:
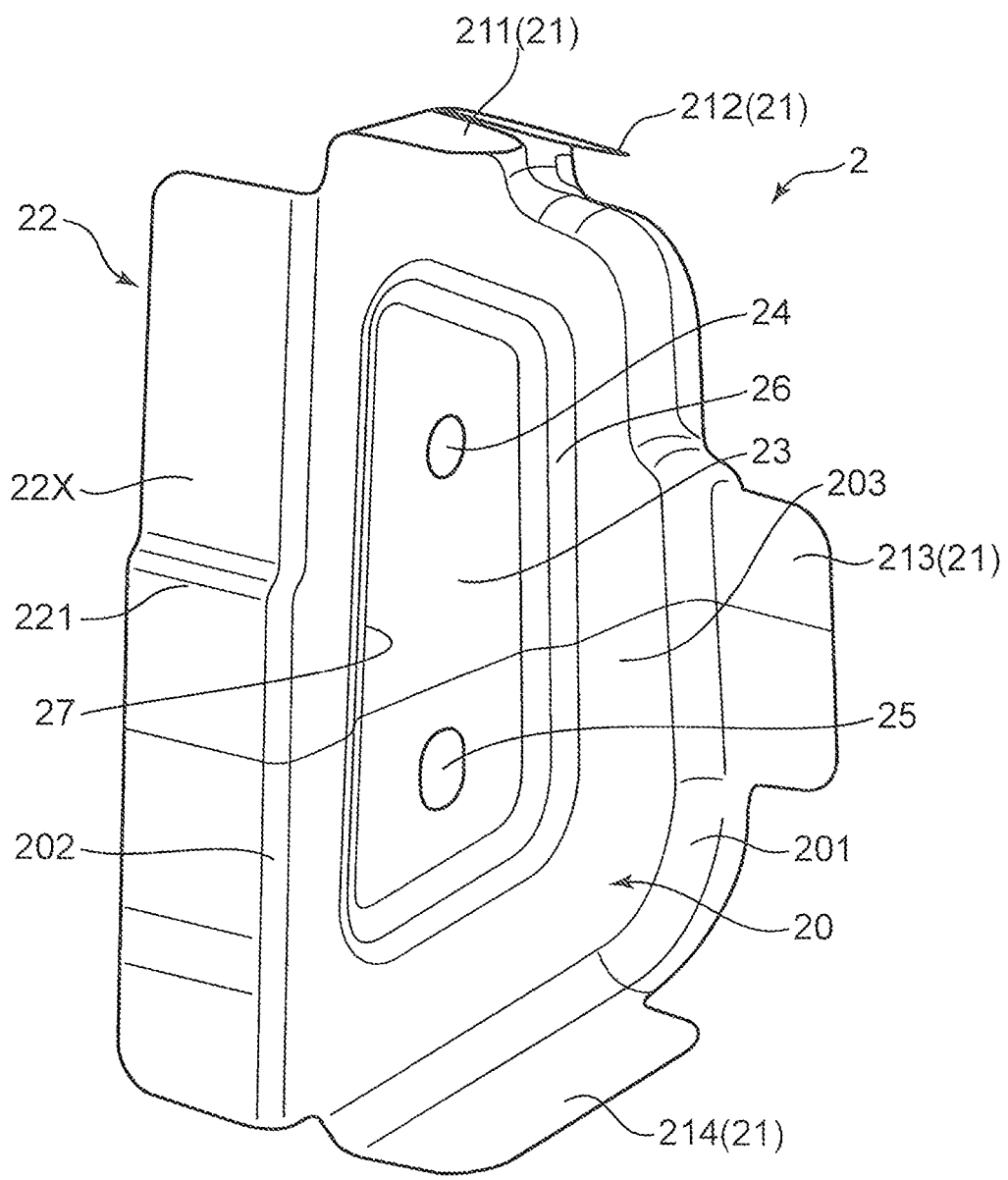
FIG. 10 is a perspective view of a first bulkhead disposed within the closed cross-sectional portion of the side sill.

Subsequently, the first bulkhead 2 will be described in detail. FIG. 10 is a perspective view of the first bulkhead 2, FIG. 11A is a side view of the first bulkhead 2, and FIG. 11B is a top view thereof. The bulkhead is also called a bamboo joint member, and is a member formed by, for example, punching and bending a plate material having excellent rigidity such as a steel material.

The first bulkhead 2 includes a first main body portion 20 which is a substantially trapezoidal flat plate-like portion, and the first joint portion 21 and the first flange portion 22. The first main body portion 20 extends between the first joint portion 21 and the first flange portion 22. Here, four joining pieces, that is, a first joining piece 211, a second joining piece 212, a third joining piece 213, and a fourth joining piece 214 are included as the first joint portion 21. A first ridge line portion 201 and a second ridge line portion 202 formed by bending exist on the outer peripheral edge of the first main body portion 20. The second ridge line portion 202 is a linear ridge line extending along the lower bottom side of the trapezoidal first main body portion 20, and the first ridge line portion 201 is a U-shaped ridge line extending along the side except the lower bottom side.

The first to fourth joining pieces 211 to 214 are bent-up portions connected to the first ridge line portion 201, and each of them has a shape of an independent tongue piece. The bent-up angles to the first main body portion 20 are approximately 90°. The first to fourth joining pieces 211 to 214 are portions which form the rigid coupling portion 2A with the side sill inner 152, and have a size capable of performing the spot welding. The first flange portion 22 is a rearward bent-up portion connected to the second ridge line portion 202, and similarly, the bent-up angle to the first main body portion 20 is approximately 90°. The first flange portion 22 is a portion which forms the flexible coupling portion 2B with the partition plate portion 135, and has a size capable of supporting the damping member 4 of a sufficient size. In order to improve the rigidity of the first flange portion 22, a stepped portion 221 extending in the front-rear direction is formed in the first flange portion 22.

The first main body portion 20 is a portion that functions as a partition surface portion which partitions the first closed cross-sectional portion C1 formed by the partition plate portion 135 and the side sill inner 152 in the front-rear direction. That is, the first main body portion 20 forms a surface extending in a direction substantially orthogonal to the extending direction of the first closed cross-sectional portion C1 within the first closed cross-sectional portion C1. Therefore, by incorporating the first bulkhead 2, it is possible to enhance the resistance to the deforming force for crushing the first closed cross-sectional portion C1, that is, the deforming force that collapses so that the side sill inner 152 and the partition plate portion 135 approach each other.

At the center of the first main body portion 20, a drawn portion 23 having a shape approximately similar to the outer shape of the first main body portion 20 is provided. The drawn portion 23 is a flat plate-like portion protruding rearward from the peripheral portion 203 in the first main body portion 20. In the drawn portion 23, a circular hole 24 and a long hole 25 which are two holes penetrating in the front-rear direction are perforated side by side in the up-down direction.

The circular hole 24 and the long hole 25 are holes having various functions. First, the holes function as holes for allowing the fluid to satisfactorily flow in the front-rear direction through the arrangement position of the first bulkhead 2. Second, the holes function as machining reference holes when the first bulkhead 2 is formed by bending a metal plate. Third, the holes function as positioning reference holes when assembling the first bulkhead 2 into the first closed cross-sectional portion C1. In the first function, the circular hole 24 and the long hole 25 are utilized as passage holes for exclusively distributing the electrodeposition solution in the side sill 15 when performing the electrodeposition coating of the rust inhibitor on the vehicle-body 1. In the second and third functions, for example, the circular hole 24 is used as a fixing hole when machining or positioning, and the long hole 25 is used as a relief hole.

The first function will be described. As described above, the first main body portion 20 functions as a partition surface portion that partitions the first closed cross-sectional portion C1. For this reason, the first main body portion 20 blocks the closed cross-sectional portion C1 of the side sill 15 extending in the front-rear direction. One of the manufacturing processes of the vehicle-body 1 includes a process of performing electrodeposition coating of a rust inhibitor on the vehicle-body 1 after assembling the vehicle-body 1, and the vehicle-body 1 is immersed in the electrodeposition liquid in this process. Here, when the first main body portion 20 blocks the first closed cross-sectional portion C1, in some cases, the electrodeposition solution does not satisfactorily spread to the inner surface (the inner surface of the side sill inner 152 and one surface of the partition plate portion 135) of the side sill 15. By forming the circular hole 24 and the long hole 25, the electrodeposition solution can flow through the circular hole 24 and the long hole 25, and good electrodeposition coating can be performed.

A drawing ridge line portion 26 formed by drawing is formed at the boundary between the peripheral portion 203 of the first main body portion 20 and the drawn portion 23. The drawing ridge line portion 26 includes a linear portion 27 extending in a direction in which the first flange portion 22 extends between the first flange portion 22, the circular hole 24 and the long hole 25. The drawing ridge line portion 26 functions as a high rigidity portion that reinforces the rigidity of the first main body portion 20 which tends to be fragile by the perforation of the circular hole 24 and the long hole 25. In particular, the linear portion 27 contributes to enhancing the rigidity of the first flange portion 22.

The aspect in which the first joint portion 21 forming the rigid coupling portion 2A is joined to the side sill inner 152 will also be described with reference to FIG. 2. The first joining piece 211 and the second joining piece 212 of the first joint portion 21 are brought into contact with the inner surface of the second upper plate 1522 of the side sill inner 152 and are fixed to the second upper plate 1522 by spot welding, respectively. The third joining piece 213 and the fourth joining piece 214 abut against the second side plate 1521 and the second lower plate 1523, respectively, and are fixed by spot welding.

The first flange portion 22 is a portion of the partition plate portion 135 of the center pillar inner 132 that faces a surface on the vehicle interior side. As illustrated in FIG. 11A, the first flange portion 22 of the present embodiment is a rectangle which is long in the up-down direction in a side view, and has a shape which is slightly curved toward the vehicle interior side as can be seen from FIG. 11B, which is the top view. The stepped portion 221 linearly extends in the front-rear direction near the center of the first flange portion 22 in the up-down direction.

The first flange portion 22 has a first surface 22X facing the partition plate portion 135, and a second surface 22Y on the side opposite thereto. The first surface 22X is a joining region that is in contact with the damping member 4 in the flexible coupling portion 2B. In other words, the first surface 22X faces the surface on the vehicle interior side of the partition plate portion 135 with a predetermined gap therebetween, and the damping member 4 is interposed in the gap. In other words, the first flange portion 22 and the partition plate portion 135 are joined to each other with the damping member 4 interposed therebetween.

In the present embodiment, as described above, as an example of the rigid coupling portion 2A, four joining pieces 211 to 214 as the first joint portion 21 are spot-welded to the side sill inner 152. The number of joining pieces, that is, the number of spot welding locations is an example, and can be appropriately set depending on the shape of the side sill inner 152 and the like. Further, the first ridge line portion 201 may be welded to the side sill inner 152, without forming a joining piece for the rigid coupling portion.

The rigid coupling portion 2A can be formed by machining other than spot welding, and may, for example, be a mechanical coupling portion using bolts, nuts or the like. In this case, holes for bolt insertion are formed in the first to fourth joining pieces 211 to 214 and the side sill inner 152. Alternatively, the rigid coupling portion 2A may be an adhesive portion using an adhesive. In this case, as the adhesive, it is possible to use an adhesive generally used for bonding the vehicle-body. For example, under the condition that the temperature is 20° C. and the frequency of the exciting force is 30 Hz, it is possible to suitably use an adhesive having a storage modulus of 2000 MPa or more and a loss factor of 0.05 or less.

The damping member 4 constituting the flexible coupling portion 2B is a member having an ability to attenuate vibration. The damping member 4 is not particularly limited as long as it is a member having a predetermined viscoelasticity, and for example, it is possible to use a viscoelastic member made of a silicone material or an acrylic material. As for the physical properties of the viscoelastic member, under the condition that the temperature is 20° C. and the frequency of the exciting force is 30 Hz, those having a storage modulus of 500 MPa or less and a loss factor of 0.2 or more are preferable from the viewpoint that the transmission of vibration can be effectively suppressed. The damping member 4 made of such a viscoelastic member absorbs vibration energy as strain energy, and converts the strain energy into thermal energy to dissipate, thereby attenuating vibration.

A method of disposing the damping member 4 on the first surface 22X of the first flange portion 22 is not particularly limited. For example, by applying a paste-like viscoelastic member to the first flange portion 22 by a predetermined thickness, a layer serving as the damping member 4 can be formed. Alternatively, a bulk piece serving as the damping member 4 may be prepared and attached to the first flange portion 22. The first flange portion 22 may be divided into a plurality of pieces in the same manner as the first joint portion 21. In this case, a layer serving as the damping member 4 is formed in each of the divided first flange portions 22.

As described above, the electrodeposition coating of the rust inhibitor is performed on the vehicle-body 1. After the electrodeposition coating process, in order to dry the rust inhibitor layer, a drying process in which the vehicle-body 1 is introduced into a heating furnace and the vehicle-body 1 is heated for a certain period at a predetermined temperature is performed. It is desirable to use the heat of this drying process in fixing of the damping member 4. That is, prior to the electrodeposition coating process, the paste-like viscoelastic member is applied to the first flange portion 22 as described above, thereby rigidly coupling (spot welding) the first bulkhead 2 carrying the coating layer serving as the damping member 4 to the side sill inner 152 in advance. Further, it is preferable to fix the coating to the partition plate portion 135, by utilizing the heat applied to the vehicle-body 1 in the drying process.

As described above, the first bulkhead 2 is disposed such that the first main body portion 20 serves as a partition surface of the first closed cross-sectional portion C1, forms the rigid coupling portion 2A with the side sill inner 152 in the first joint portion 21, and forms the flexible coupling portion 2B with the partition plate portion 135 of the center pillar inner 132 via the damping member 4 in the first flange portion 22. As a result, the deformation resistance of the first closed cross-sectional portion C1 is enhanced, and the rigidity of the side sill 15 is improved. Further, the stress generated by the vibration of the vehicle is concentrated on the deformable flexible coupling portion 2B, and the vibration is attenuated by the damping member 4.

In order to enhance the rigidity of the first bulkhead 2, the first bulkhead 2 has the drawing ridge line portion 26 in the first main body portion 20, and has the stepped portion 221 in the first flange portion 22, respectively. The drawing ridge line portion 26 enhances the rigidity of the first main body portion 20 having the circular hole 24 and the long hole 25 needed to be drilled for various reasons. The stepped portion 221 enhances the rigidity of the belt-like first flange portion 22 which is long in the up-down direction. Therefore, the rigidity of the first bulkhead 2 is high, and the reinforcing capability of the first closed cross-sectional portion C1 can be improved.

Furthermore, by enhancing the rigidity of the first bulkhead 2, the difference in rigidity between the first bulkhead 2 and the damping member 4 further increases, and when vibration occurs in the vehicle-body 1, the degree of stress concentration on the damping member 4 is further enhanced. In a case where rigidity of the first bulkhead 2 is low, for example, in a case where the first main body portion 20 weakened due to perforation of the circular hole 24 and the long hole 25 is comparatively easily bent and deformed, when vibration is applied the first bulkhead 2, the overall vibrational stress is not transmitted to the damping member 4, and a part of the vibrational stress is consumed in the bending deformation. Therefore, the vibration damping effect of the damping member 4 decreases. Meanwhile, in the present embodiment, since the rigidity of the first bulkhead 2 is enhanced around the damping member 4 by the drawing ridge line portion 26, particularly, the linear portion 27 and the stepped portion 221, it is possible to transmit the vibration stress to the damping member 4 without loss. Therefore, it is possible to further enhance the vibration damping effect of the damping member 4.

[Detailed Description of Second Bulkhead]

Figure 13A:
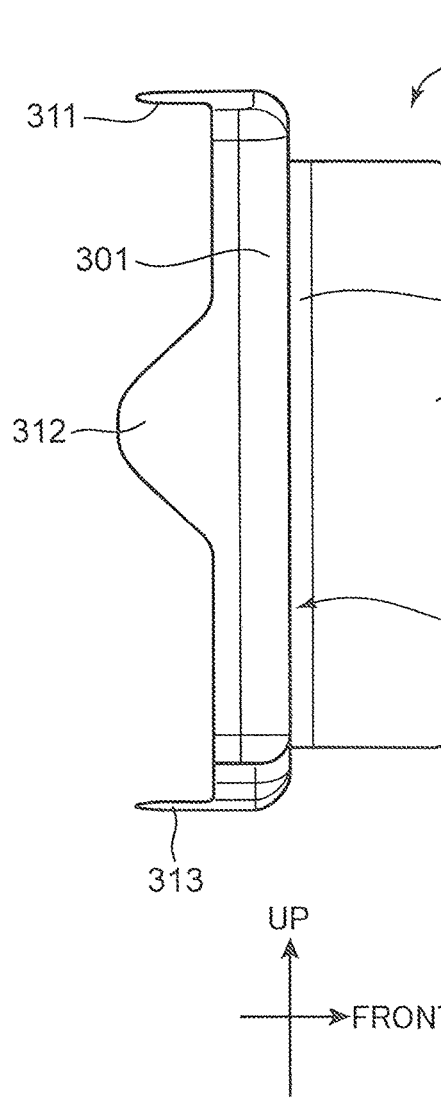
FIG. 13A is a side view of the second bulkhead.
Figure 13B:
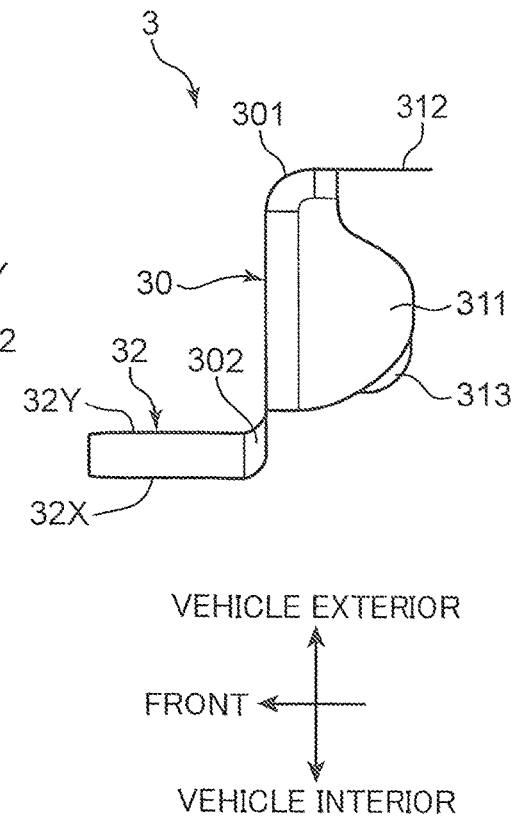
FIG. 13B is a top view of the second bulkhead.

Subsequently, the second bulkhead 3 will be described. FIG. 12 is a perspective view of the second bulkhead 3, FIG. 13A is a side view of the second bulkhead 3, and FIG. 13B is a top view thereof. The second bulkhead 3 also has a structure similar to that of the first bulkhead 2, but the coupling portion to be formed is only the rigid coupling portion 3A. Further, the description of the same parts as those of the first bulkhead 2 will be simplified or will not be provided.

The second bulkhead 3 includes a second main body portion 30 which is a substantially rectangular flat plate-like portion, a second joint portion 31 and a second flange portion 32. The second main body portion 30 extends between the second joint portion 31 and the second flange portion 32. Here, three joining pieces, that is, a fifth joining piece 311, a sixth joining piece 312 and a seventh joining piece 313 are included as the second joint portion 31. On the outer peripheral edge of the second main body portion 30, there are a third ridge line portion 301 and a fourth ridge line portion 302 formed by bending. The fourth ridge line portion 302 is a linear ridge line extending along one side of the rectangular second main body portion 30 in the up-down direction, and the third ridge line portion 301 is a U-shaped ridge line along the side except the one side.

The fifth to seventh joining pieces 311 to 313 are rearward bent-up portions connected to the third ridge line portion 301, and each of the fifth to seventh joining pieces 311 to 313 has an independent tongue-like shape. The bent-up angle to the second main body portion 30 is approximately 90°. The fifth to seventh joining pieces 311 to 313 are portions that form the rigid coupling portion 3A with the side sill outer reinforcer 151. The second flange portion 32 is a forward bent-up portion connected to the fourth ridge line portion 302, and similarly, the bent-up angle to the second main body portion 30 is approximately 90°. The second flange portion 32 is a portion that forms another rigid coupling portion 3A with the partition plate portion 135.

The second main body portion 30 is a portion that functions as a partition surface portion which partitions the second closed cross-sectional portion C2 formed by the partition plate portion 135 and the side sill outer reinforcer 151 in the front-rear direction. By incorporating the second bulkhead 3, it is possible to enhance the resistance to the deforming force which crushes the second closed cross-sectional portion C2. In the second main body portion 30, a long hole 33 and a circular hole 34 are perforated in the up-down direction. These holes are holes that perform the same function as the circular holes 24 and the long holes 25 of the first bulkhead 2.

Referring to FIG. 2, the fifth joining piece 311 of the second joint portion 31 is brought into contact with the inner surface of the first upper plate 1512 of the side sill outer reinforcer 151, and is fixed to the first upper plate 1512 by spot welding. The sixth joining piece 312 is brought into contact with the bulge portion bulging in the vehicle interior direction of the first side plate 1511, and the seventh joining piece 313 is brought into contact with the first lower plate 1513, respectively, and the sixth joining piece 312 and the seventh joining piece 313 are fixed by spot welding.

Meanwhile, the second flange portion 32 is brought into contact with the vehicle exterior surface of the partition plate portion 135 of the center pillar inner 132, and is fixed to the partition plate portion 135 by spot welding. The second flange portion 32 has a first surface 32X facing the partition plate portion 135, and a second surface 32Y on the opposite side thereof, and the first surface 32X is joined to the vehicle exterior surface of the partition plate portion 135. As illustrated in FIG. 3, the second flange portion 32 is joined to the partition plate portion 135 so as to substantially entirely overlap the first flange portion 22 of the first bulkhead 2 in the vehicle width direction (the thickness direction of the partition plate portion 135) via the partition plate portion 135.

As described above, the second bulkhead 3 is disposed such that the second main body portion 30 is the partition surface of the second closed cross-sectional portion C2, forms the rigid coupling portion 3A with the side sill outer reinforcer 151 in the second joint portion 31, and forms another rigid coupling portion 3A with the partition plate portion 135 of the center pillar inner 132 in the second flange portion 32. Therefore, the deformation resistance of the second closed cross-sectional portion C2 is enhanced. Accordingly, in combination with the reinforcement of the second closed cross-sectional portion C2 provided by the second bulkhead 3 and the reinforcement of the first closed cross-sectional portion C1 provided by the first bulkhead 2, the rigidity of the side sill 15 having a partitioned closed cross-sectional structure by the partition plate portion 135 extending in the front-rear direction is enhanced.

Further, in the vicinity of the flexible coupling portion 2B formed by the first bulkhead 2, the second bulkhead 3 forms a rigid coupling portion 3A. In particular, the second flange portion 32 forms a rigid coupling portion 3A so as to overlap the flexible coupling portion 2B with the partition plate portion 135 interposed therebetween. For this reason, the stress generated by the vibration of the vehicle is concentrated on the deformable flexible coupling portion 2B, and the vibration is effectively attenuated by the damping member 4.

[Description on Arrangement of Bulkhead]

Subsequently, the arrangement relation between the first bulkhead 2 and the second bulkhead 3 will be described. FIG. 14 is a diagram schematically illustrating the joining state of the first and second bulkheads 2 and 3 on the front side of FIG. 3. A characteristic feature of the arrangement of the two bulkheads is that the flat plate-like first main body portion 20 of the first bulkhead 2 and the flat plate-like second main body portion 30 of the second bulkhead 3 are linearly aligned in the vehicle width direction as illustrated by an arrow L1 in FIG. 14. As described above, the first flange portion 22 and the second flange portion 32 are disposed so as to overlap each other in the vehicle width direction with the partition plate portion 135 and the damping member 4 interposed therebetween.

By disposing the first and second bulkheads 2 and 3 so that the first and second main body portions 20 and 30 are linearly aligned, the mechanical strength of the side sills 15 can be enhanced. The side sill 15 has a partitioned closed cross-sectional structure having the first and second closed cross-sectional portions C1 and C2 partitioned by the partition plate portion 135 and aligned in the vehicle width direction, in the connecting portion J. In the closed cross-sectional structure, since the first and second main body portions 20 and 30 are linearly aligned, when a pressing force in the vehicle width direction acts on one main body portion, the pressing force can be directly transmitted to the main body portion. Therefore, it is possible to further enhance the mechanical strength in the direction in which the side sill outer reinforcer 151 and the side sill inner 152 approach each other, that is, the deformation resistance against the side collision of the vehicle-body 1. Further, the linear shape means that two members (the first and second main body portions 20 and 30) are disposed along a straight line or a line approximate to the straight line, and is not limited to a case where the two members are completely disposed along the straight line.

Furthermore, in the present embodiment, the first main body portion 20 and the second main body portion 30 extend to be orthogonal to the partition plate portion 135, respectively. That is, the straight line bodies of the first and second main body portions 20 and 30 as indicated by the arrow L1 intersect with the partition plate portion 135 at an intersection angle of about 90°. Therefore, it is possible to further enhance the mechanical strength in the direction in which the side sill outer reinforcer 151 and the side sill inner 152 approach each other. For example, the cross-section of the side sill 15 illustrated in FIG. 2 is a shape in which two substantially rectangles are arranged side by side in the vehicle width direction (partitioned closed cross-sectional structure). The first and second main body portions 20 and 30 further enhance the effect of suppressing the cross-section from deforming into a diamond shape when a force in the vehicle width direction acts on the side sill 15. Further, the term "orthogonal" as used herein means that the partition plate portion 135 and the linear bodies of the first and second main body portions 20 and 30 are disposed to intersect with each other at an intersection angle of approximately 80 to 100 degrees, and is not limited to a case where both are disposed at an intersection angles of 90 degrees.

Further, as illustrated in FIGS. 3 and 8, the first and second bulkheads 2 and 3 are disposed near a front end edge 135F and a rear end edge 135B (end portion in the predetermined direction) in the partition plate portion 135 (partition panel) of the center pillar inner 132, respectively. The front end edge 135F illustrated in FIG. 14 will be described in detail. From the rearward position from the front end edge 135F by a predetermined length, the first main body portion 20 extends toward the side sill inner 152 side, and the second main body portion 30 extends toward the side sill outer reinforcer 151 side, respectively. The same also applies to the rear end edge 135B.

The first and second flange portions 22 and 32 interpose the vicinity of the end portion of the partition plate portion 135 located on the front side of the position at which the first and second main body portions 20 and 30 extend. That is, the first and second main body portions 20 and 30 linearly aligned orthogonally intersect with the partition plate portion 135 in a state in which the vicinity of the end portion protrudes to the front side. The flexible coupling portion 2B is formed to interpose the damping member 4 between the first flange portion 22 and the partition plate portion 135 in the vicinity of the end portion protruding in this manner.

Since the partition plate portion 135 has the end portions (the front end edge 135F and the rear end edge 135B) within the closed cross-sectional portion of the side sill 15, the end portions are portions in which deformation based on vibration is likely to occur. According to the present embodiment, the vicinity of the end portion of the partition plate portion 135 protruding forward from the position in which the first and second main body portions 20 and 30 intersect with each other is a free end in which there is no constraining member. Therefore, when vibration occurs in the vehicle, the vicinity becomes a portion that allows deformation due to the vibration. Therefore, the strain stress generated by the vibration can be concentrated on the flexible coupling portion 2B, and the vibration damping effect of the damping member 4 can be enhanced.

[Description Of Modified Embodiment]

FIG. 15 is a cross-sectional view in the vehicle width direction of a coupling portion between the side sill 15 and the center pillar 13 according to the modified embodiment. This modified embodiment is different from the embodiment in that a first main body portion 200A of the first bulkhead 200 and the second main body portion 30 of the second bulkhead 3 are arranged so as to be connected to offset from each other in the vehicle width direction. The configurations other than the first bulkhead 200 are the same as those in the embodiment.

The first bulkhead 200 according to the modified embodiment includes the first main body portion 200A having a plate-like shape, a first joint portion 210 forming the rigid coupling portion 2A with the side sill inner 152, and a first flange portion 220 forming a flexible coupling portion 2B with the partition plate portion 135. Similarly to the embodiment described above, the second bulkhead 3 forms the two rigid coupling portions 3A by the second joint portion 31 and the second flange portion 32. The first and second bulkheads 200 and 3 on the front side are disposed near the front end edge 135F of the partition plate portion 135 of the center pillar inner 132, respectively. The first and second bulkheads 200 and 3 on the rear side are disposed near the rear end edge 135B, respectively.

FIG. 16 is a diagram illustrating the joining state of the first and second bulkheads 200 and 3 on the front side of FIG. 15. The first main body portion 200A of the first bulkhead 200 extends from the position of the front end edge 135F of the partition plate portion 135 toward the side sill inner 152 in a direction orthogonal to the partition plate portion 135. The first flange portion 220 extends rearward from the end edge of the first main body portion 200A. Meanwhile, the second main body portion 30 of the second bulkhead 3 extends from the rear position of the front end edge 135F by a predetermined length toward the side sill outer reinforcer 151 in a direction orthogonal to the partition plate portion 135. The second flange portion 32 extends forward from the position at which the second main body portion 30 extends. The flexible coupling portion 2B is formed by interposing the partition plate portion 135 and the damping member 4 between the first and second flange portions 220 and 32. The same also applies to the rear end edge 135B.

Since the first and second bulkheads 200 and 3 are disposed as described above, in this modified embodiment, as illustrated by the arrow L2 in FIG. 16, the first main body portion 200A and the second main body portion 30 are connected to be offset from each other. By providing such an offset structure, as compared with a case where the first and second main body portions 20 and 30 have linear shapes as in the embodiment, the partition plate portion 135 is easily deformed in the front-rear direction or in the vehicle width direction. As a result, it is possible to impart larger strain stress to the damping member 4 of the flexible coupling portion 2B. Therefore, the vibration damping effect of the damping member 4 can be enhanced.

The modified embodiment illustrates an aspect in which the first and second bulkheads 200 and 3 are disposed such that the first flange portion 220 and the second flange portion 32 substantially completely overlap each other in the vehicle width direction (the thickness direction of the partition plate portion 135). In place of this aspect, the first and second main body portions 20 and 30 may be offset to such an extent that the first and second flange portions 220 and 32 are in close with but do not overlap each other. However, due to the offset, the rigidity of the side sill 15 slightly decreases.

Therefore, it is desirable to have an arrangement relation in which at least part of the first flange portion 220 and at least part of the second flange portion 32 are joined to the partition plate portion 135 so as to overlap each other via the partition plate portion 135 in the thickness direction of the partition plate portion 135. With such an arrangement relation, the extent of the offset is set such that at least part of the first and second flange portions 220 and 32 overlap each other, and the rigidity does not decrease so much. Therefore, it is possible to sufficiently impart the deformation resistance of the closed cross-sectional portion of the side sill 15, while applying appropriate strain stress to the damping member 4.

[Description of Another Modified Embodiment]

Although the embodiment of the present invention has been described above, the present invention is not limited to this embodiment, and the following modified embodiment can be further adopted.

Figure 17:
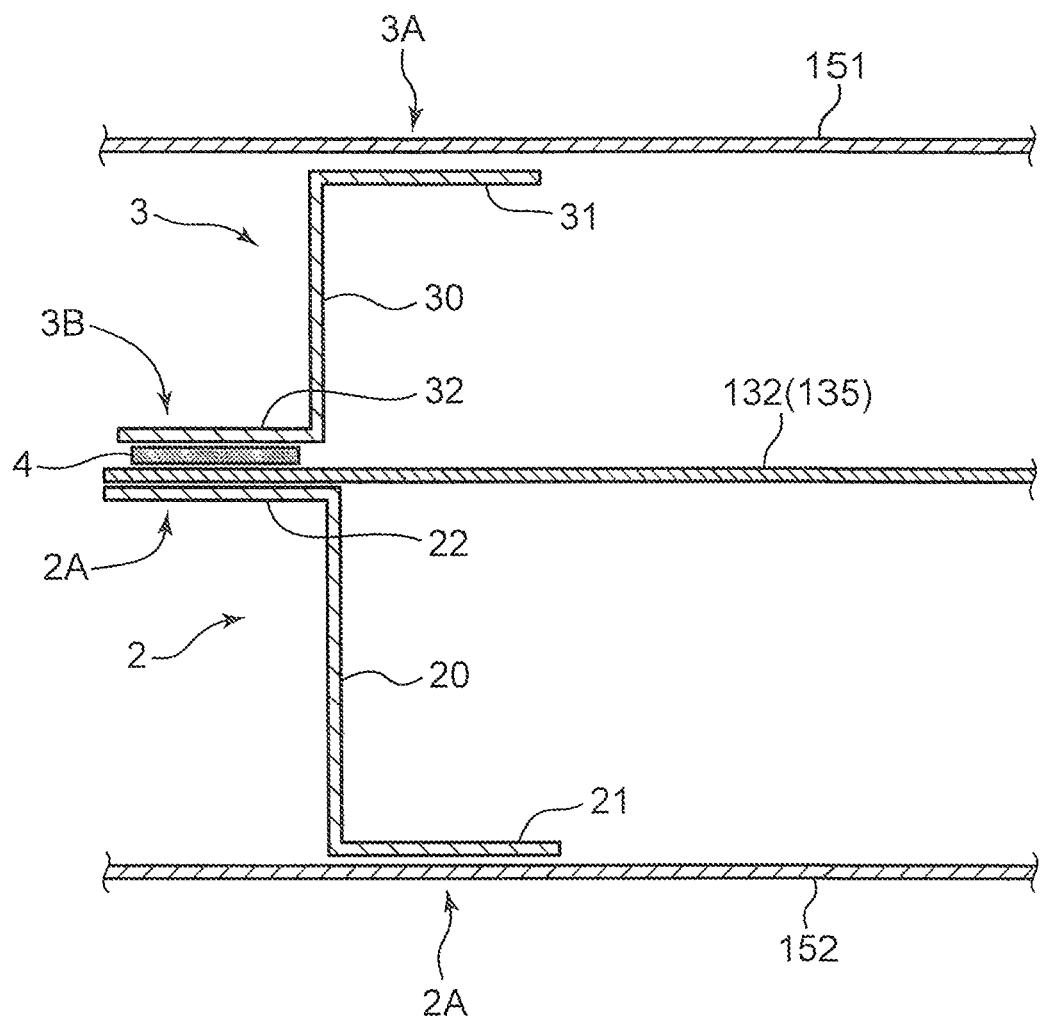
FIG. 17 is a cross-sectional view in the vehicle width direction of the coupling portion between the side sill and the center pillar according to another modified embodiment.

(1) In the above embodiment, an example is illustrated in which the first bulkhead 2 forms the flexible coupling portion 2B and the second bulkhead 3 forms only the rigid coupling portion 3A. Alternatively, the second bulkhead 3 may be configured to form a flexible coupling portion. FIG. 17 is a cross-sectional view in the vehicle width direction of the connecting portion between the side sill 15 and the center pillar 13 according to this modified embodiment. The joint portion formed by the first bulkhead 2 includes a rigid coupling portion 2A in which the side sill inner 152 and the first joint portion 21 are coupled while being in contact with each other, and a rigid coupling portion 2A in which a partition plate portion 135 and the first flange portion 22 are coupled while being in contact with each other.

In contrast, the joint portion formed by the second bulkhead 3 includes a rigid coupling portion 3A in which the side sill outer reinforcer 151 and the second joint portion 31 are coupled while being in contact with each other, and a flexible coupling portion 3B in which the partition plate portion 135 and the second flange portion 32 are coupled to each other in a state of interposing the damping member 4 therebetween. In the modified embodiment, the side sill outer reinforcer 151 is a first panel in the claims, the side sill inner 152 is a second panel, and the second bulkhead 3 is a first reinforcement body. Even with such a modified embodiment, the same operation and effect as the embodiment are exhibited.

Figure 18:
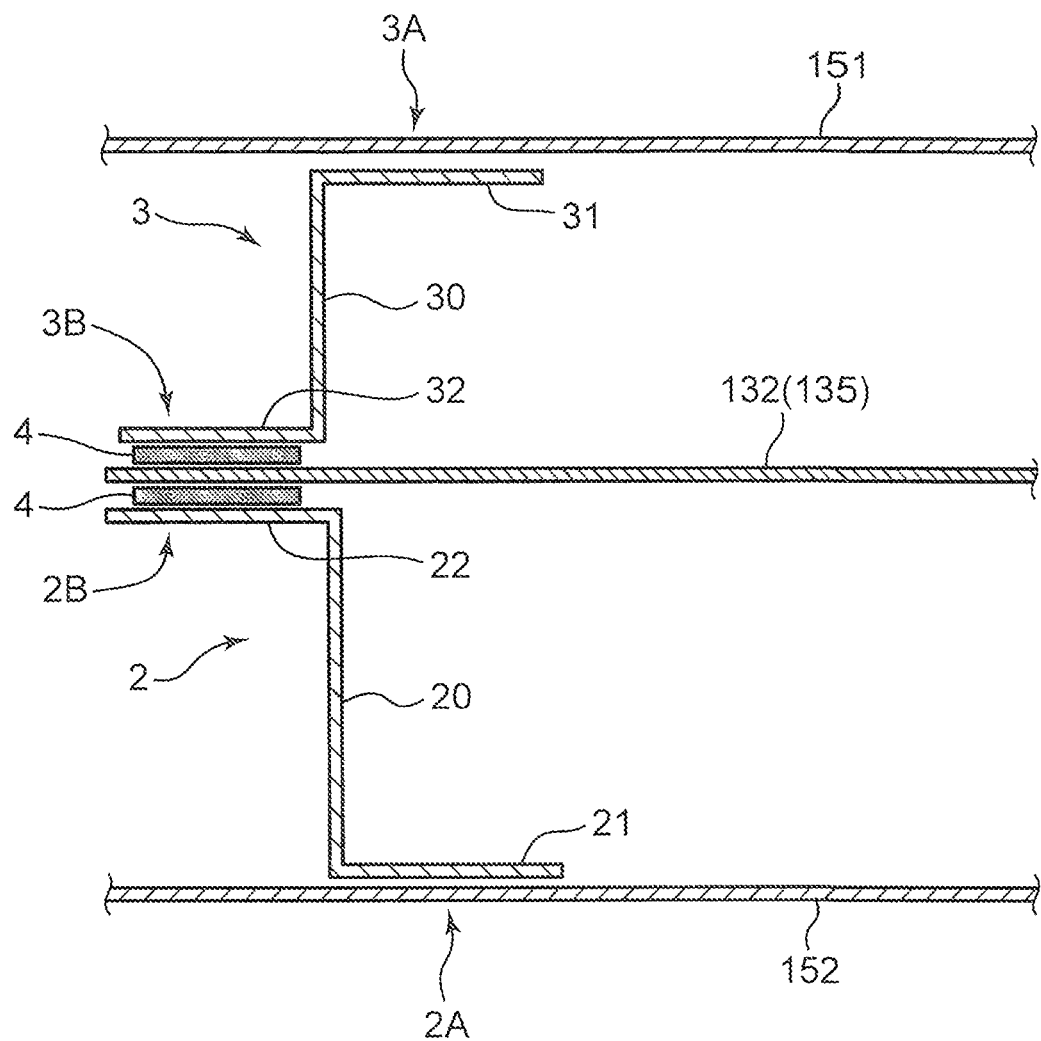
FIG. 18 is a cross-sectional view in the vehicle width direction of the coupling portion between the side sill and the center pillar according to another modified embodiment.

(2) Further, a flexible coupling portion may not be formed by any one of the first and second bulkheads 2 and 3, and may be formed by both of the first and second bulkheads 2 and 3. FIG. 18 is a cross-sectional view in the vehicle width direction of a connecting portion between the side sill 15 and the center pillar 13 according to this modified embodiment. The joint portion formed by the first bulkhead 2 includes a rigid coupling portion 2A in which the side sill inner 152 and the first joint portion 21 are coupled while being in contact with each other, and a flexible coupling portion 2B in which the partition plate portion 135 and the first flange portion 22 are coupled to each other while interposing the damping member 4 therebetween.

In addition, the joint portion formed by the second bulkhead 3 includes a rigid coupling portion 3A in which the side sill outer reinforcer 151 and the second joint portion 31 are coupled while being in contact with each other, and a flexible coupling portion 3B in which the partition plate portion 135 and the second flange portion 32 are coupled to each other while interposing the damping member 4 therebetween. According to this modified embodiment, two flexible coupling portions 2B and 3B are provided, and satisfactory vibration damping can be achieved by the damping members 4 disposed on each of them.

(3) In the embodiment, an example in which the body structure according to the present invention is applied to the connecting portion J between the side sill 15 and the center pillar 13 is illustrated. This is an example, and for example, the present invention may be applied to a connecting portion between the side sill 15 and the front pillar 12. In addition, the present invention can be widely applied to a portion which has a partitioned closed cross-sectional structure which includes two panels (frames) forming a closed cross-sectional portion extending in a predetermined direction, and a partition panel extending in the predetermined direction and disposed in the closed cross-sectional portion.

Finally, the characteristic configurations disclosed in the embodiment and the operation effects based thereon will be collectively described.

The body structure of vehicle according to the above embodiment includes: a first panel and a second panel forming a closed cross-sectional portion extending in a predetermined direction; a partition panel extending in the predetermined direction and disposed in the closed cross-sectional portion; a first reinforcement body which is disposed between the first panel and the partition panel in the closed cross-sectional portion, and includes a first panel joint portion joined to the first panel and a first flange portion joined to the partition panel; and a second reinforcement body which is disposed between the second panel and the partition panel in the closed cross-sectional portion, and includes a second panel joint portion joined to the second panel, and a second flange portion joined to the partition panel, in which the joint portion formed by the first reinforcement body includes a rigid coupling portion in which the first panel and the first panel joint portion are coupled while being in contact with each other, and a flexible coupling portion in which the partition panel and the first flange portion are coupled to each other while interposing a damping member therebetween.

According to the body structure, two reinforcement bodies of the first reinforcement body and the second reinforcement body are disposed in the closed cross-sectional portion with the partition panel interposed therebetween. Therefore, the deformation resistance of the closed cross-sectional portion can be enhanced by these reinforcement bodies. Further, the first reinforcement body forms a rigid coupling portion with the first panel, and a flexible coupling portion with the partition panel. Therefore, vibration of the body can be effectively attenuated by the damping member disposed in the flexible coupling portion.

In the body structure, a joint portion formed by the second reinforcement body includes a rigid coupling portion in which the second panel and the second panel joint portion are coupled while being in contact with each other, and a rigid coupling portion in which the partition panel and the second flange portion are coupled while being in contact with each other.

According to the body structure, since the second reinforcement body is rigidly coupled with any of the panels, it is possible to enhance the rigidity around the flexible coupling portion formed by the first reinforcement body. Therefore, it is possible to concentrate the strain stress generated by vibration of the vehicle on the flexible coupling portion. As a result, only the damping member can be exclusively distorted, and the vibration damping effect of the damping member can be enhanced.

In the body structure, the joint portion formed by the second reinforcement body may include a rigid coupling portion in which the second panel and the second panel joint portion are coupled while being in contact with each other, and a flexible coupling portion in which the partition panel and the second flange portion are coupled to each other while interposing a damping member therebetween.

According to this body structure, not only the first reinforcement body but also the second reinforcement body form a flexible coupling portion. Therefore, vibration of the vehicle can be attenuated by the damping members each disposed in the two flexible coupling portions, and the vibration damping effect can be enhanced.

In the body structure, the first reinforcement body includes a flat plate-like first main body portion extending between the first panel joint portion and the first flange portion, the second reinforcement body includes a flat plate-like second main body portion extending between the second panel joint portion and the second flange portion, and the first reinforcement body and the second reinforcement body are preferably disposed such that the first main body portion and the second main body portion are linearly aligned between the first panel and the second panel.

According to the body structure, since the first main body portion and the second main body portion are linearly aligned, it is possible to enhance the mechanical strength of the closed cross-sectional portion in a direction in which the first and second panels approach each other. Therefore, it is possible to further enhance the deformation resistance of the closed cross-sectional portion, while exhibiting the vibration damping function.

In this case, if the first main body portion and the second main body portion extend to be orthogonal to the partition panel, the mechanical strength can be further enhanced.

In the body structure, the partition panel includes an end portion in the predetermined direction, the first flange portion and the second flange portion are joined to the partition panel near the end portion, and the first main body portion and the second main body portion that are linearly aligned preferably intersect with the partition panel in a state in which the vicinity of the end portion protrudes.

When the partition panel has an end portion in the closed cross-sectional portion, the end portion is a portion in which deformation based on vibration is likely to occur. According to the body structure, since the first main body portion and the second main body portion that are linearly aligned has a structure which intersects with the partition panel in a state in which the vicinity of the end portion protrudes, the vicinity of the end portion is a free end, which permits deformation due to the vibration. Therefore, the strain stress generated by the vibration of the vehicle can be concentrated on the flexible coupling portion, and the vibration damping effect can be enhanced.

In the body structure, the first reinforcement body includes a flat plate-like first main body portion extending between the first panel joint portion and the first flange portion, the second reinforcement body includes a flat plate-like second main body portion extending between the second panel joint portion and the second flange portion, and the first reinforcement body and the second reinforcement body are preferably disposed such that the first main body portion and the second main body portion are connected to each other to be offset between the first panel and the second panel.

According to the body structure, by providing the offset structure, the partition panel is easily deformed as compared with a case where the first main body portion and the second main body portion have linear shapes. This leads to imparting a large strain stress to the damping member of the flexible coupling portion. Therefore, the vibration damping effect of the damping member can be enhanced.

In this case, in a thickness direction of the partition panel, at least part of the first flange portion and at least part of the second flange portion are preferably joined to the partition panel so as to overlap each other via the partition panel.

According to this body structure, the extent of the offset is set such that at least part of the first flange portion and at least part of the second flange portion overlap each other. Therefore, it is possible to provide a sufficient deformation resistance of the closed cross-sectional portion, while applying appropriate strain stress to the damping member.

According to the present invention, in a vehicle-body portion of a partitioned closed cross-sectional structure, it is possible to provide a body structure capable of effectively exhibiting the attenuating function of the vibration by the damping member, while preventing the deformation of the closed cross-sectional portion. Therefore, it is possible to improve the strength of the closed cross-sectional portion and to improve the riding comfort of the vehicle.

The invention claimed is:

1. A body structure of a vehicle comprising:
a first panel and a second panel which form a closed cross-sectional portion extending in a predetermined direction;
a partition panel which extends in the predetermined direction and is disposed inside the closed cross-sectional portion;
a first reinforcement body which is disposed between the first panel and the partition panel in the closed cross-sectional portion, and includes a first panel joint portion joined to the first panel, and a first flange portion joined to the partition panel; and
a second reinforcement body which is disposed between the second panel and the partition panel in the closed cross-sectional portion, and includes a second panel joint portion joined to the second panel, and a second flange portion joined to the partition panel,
wherein a joint portion formed by the first reinforcement body includes a rigid coupling portion in which the first panel and the first panel joint portion are coupled while being in contact with each other, and a flexible coupling portion in which the partition panel and the first flange portion are coupled to each other while interposing a damping member therebetween.

2. The body structure of the vehicle according to claim 1, wherein a joint portion formed by the second reinforcement body includes a rigid coupling portion in which the second panel and the second panel joint portion are coupled while being in contact with each other, and a rigid coupling portion in which the partition panel and the second flange portion are coupled while being in contact with each other.

3. The body structure of the vehicle according to claim 2, wherein the first reinforcement body includes a flat plate-like first main body portion extending between the first panel joint portion and the first flange portion,
the second reinforcement body includes a flat plate-like second main body portion extending between the second panel joint portion and the second flange portion, and
the first reinforcement body and the second reinforcement body are disposed such that the first main body portion and the second main body portion are linearly aligned between the first panel and the second panel.

4. The body structure of the vehicle according to claim 3, wherein the first main body portion and the second main body portion extend to be orthogonal to the partition panel.

5. The body structure of the vehicle according to claim 4, wherein the partition panel includes an end portion in the predetermined direction,
the first flange portion and the second flange portion are joined to the partition panel near the end portion, and the first main body portion and the second main body portion that are linearly aligned intersect with the partition panel in a state in which the vicinity of the end portion protrudes.

6. The body structure of the vehicle according to claim 2, wherein the first reinforcement body includes a flat plate-like first main body portion extending between the first panel joint portion and the first flange portion,
the second reinforcement body includes a flat plate-like second main body portion extending between the second panel joint portion and the second flange portion, and
the first reinforcement body and the second reinforcement body are disposed such that the first main body portion and the second main body portion are connected to each other to be offset between the first panel and the second panel.

7. The body structure of the vehicle according to claim 6, wherein, in a thickness direction of the partition panel, each of at least part of the first flange portion and at least part of the second flange portion is joined to the partition panel so as to overlap each other via the partition panel.

8. The body structure of the vehicle according to claim 1, wherein a joint portion formed by the second reinforcement body includes a rigid coupling portion in which the second panel and the second panel joint portion are coupled while being in contact with each other, and a flexible coupling portion in which the partition panel and the second flange portion are coupled to each other while interposing a damping member therebetween.

9. The body structure of the vehicle according to claim 8, wherein the first reinforcement body includes a flat plate-like first main body portion extending between the first panel joint portion and the first flange portion,
the second reinforcement body includes a flat plate-like second main body portion extending between the second panel joint portion and the second flange portion, and
the first reinforcement body and the second reinforcement body are disposed such that the first main body portion and the second main body portion are linearly aligned between the first panel and the second panel.

10. The body structure of the vehicle according to claim 9, wherein the first main body portion and the second main body portion extend to be orthogonal to the partition panel.

11. The body structure of the vehicle according to claim 10, wherein the partition panel includes an end portion in the predetermined direction,
the first flange portion and the second flange portion are joined to the partition panel near the end portion, and
the first main body portion and the second main body portion that are linearly aligned intersect with the partition panel in a state in which the vicinity of the end portion protrudes.

12. The body structure of the vehicle according to claim 8, wherein the first reinforcement body includes a flat plate-like first main body portion extending between the first panel joint portion and the first flange portion,
the second reinforcement body includes a flat plate-like second main body portion extending between the second panel joint portion and the second flange portion, and
the first reinforcement body and the second reinforcement body are disposed such that the first main body portion and the second main body portion are connected to each other to be offset between the first panel and the second panel.

13. The body structure of the vehicle according to claim 12, wherein, in a thickness direction of the partition panel, each of at least part of the first flange portion and at least part of the second flange portion is joined to the partition panel so as to overlap each other via the partition panel.

14. The body structure of the vehicle according to claim 1, wherein the first reinforcement body includes a flat plate-like first main body portion extending between the first panel joint portion and the first flange portion,
the second reinforcement body includes a flat plate-like second main body portion extending between the second panel joint portion and the second flange portion, and
the first reinforcement body and the second reinforcement body are disposed such that the first main body portion and the second main body portion are linearly aligned between the first panel and the second panel.

15. The body structure of the vehicle according to claim 14, wherein the first main body portion and the second main body portion extend to be orthogonal to the partition panel.

16. The body structure of the vehicle according to claim 15, wherein the partition panel includes an end portion in the predetermined direction,
the first flange portion and the second flange portion are joined to the partition panel near the end portion, and
the first main body portion and the second main body portion that are linearly aligned intersect with the partition panel in a state in which the vicinity of the end portion protrudes.

17. The body structure of the vehicle according to claim 14, wherein the partition panel includes an end portion in the predetermined direction,
the first flange portion and the second flange portion are joined to the partition panel near the end portion, and
the first main body portion and the second main body portion that are linearly aligned intersect with the partition panel in a state in which the vicinity of the end portion protrudes.

18. The body structure of the vehicle according to claim 1, wherein the first reinforcement body includes a flat plate-like first main body portion extending between the first panel joint portion and the first flange portion,
the second reinforcement body includes a flat plate-like second main body portion extending between the second panel joint portion and the second flange portion, and
the first reinforcement body and the second reinforcement body are disposed such that the first main body portion and the second main body portion are connected to each other to be offset between the first panel and the second panel.

19. The body structure of the vehicle according to claim 18, wherein, in a thickness direction of the partition panel, each of at least part of the first flange portion and at least part of the second flange portion is joined to the partition panel so as to overlap each other via the partition panel.

* * * * *